US011308230B2

(12) United States Patent
Hajnoczi et al.

(10) Patent No.: US 11,308,230 B2
(45) Date of Patent: Apr. 19, 2022

(54) DIRECT ACCESS TO HOST MEMORY FOR GUESTS

(71) Applicant: Red Hat, Inc., Raleigh, NC (US)

(72) Inventors: Stefan Hajnoczi, St. Neots (GB);
Vivek Goyal, Westford, MA (US);
David Alan Gilbert, Manchester (GB);
Steven John Whitehouse, Swansea
(GB); Miklos Szeredi, Piliscsaba (HU)

(73) Assignee: Red Hat, Inc., Raleigh, NC (US)

( * ) Notice: Subject to any disclaimer, the term of this patent is extended or adjusted under 35 U.S.C. 154(b) by 716 days.

(21) Appl. No.: 16/259,595

(22) Filed: Jan. 28, 2019

(65) Prior Publication Data

US 2020/0242264 A1 Jul. 30, 2020

(51) Int. Cl.
| | |
|---|---|
| *G06F 21/62* | (2013.01) |
| *G06F 21/53* | (2013.01) |
| *G06F 21/60* | (2013.01) |
| *G06F 12/1009* | (2016.01) |
| *G06F 12/0804* | (2016.01) |

(Continued)

(52) U.S. Cl.
CPC ...... *G06F 21/6218* (2013.01); *G06F 9/45558* (2013.01); *G06F 9/546* (2013.01); *G06F 12/0804* (2013.01); *G06F 12/1009* (2013.01); *G06F 21/53* (2013.01); *G06F 21/604* (2013.01); *G06F 2009/45579* (2013.01); *G06F 2209/548* (2013.01); *G06F 2212/151* (2013.01); *G06F 2212/206* (2013.01); *G06F 2221/2141* (2013.01)

(58) Field of Classification Search
None
See application file for complete search history.

(56) References Cited

U.S. PATENT DOCUMENTS

| 8,677,449 B1 | 5/2014 | Beda, III | |
|---|---|---|---|
| 9,104,339 B1 * | 8/2015 | Kalekar | ................ G06F 3/0644 |

(Continued)

OTHER PUBLICATIONS

Clear Containers Architecture by James O. D. Hunt et al.; GitHub; https://github.com/clearcontainers/runtime/blob/master/docs/architecture/architecture.md; retrieved Oct. 31, 2018; pp. 1-17.

(Continued)

*Primary Examiner* — Chat C Do
*Assistant Examiner* — William C Wood
(74) *Attorney, Agent, or Firm* — K&L Gates LLP

(57) ABSTRACT

Direct access to host memory for guests is disclosed. For example, a system includes a processor, a host memory, a filesystem daemon, a guest including a storage controller, and a filesystem queue accessible to the filesystem daemon and the storage controller. The storage controller receives a file retrieval request associated with a file stored in the host memory and forwards the file retrieval request to the filesystem daemon by adding the file retrieval request to the filesystem queue. The filesystem daemon retrieves the file retrieval request from the filesystem queue, determines a host memory address (HMA) associated with the file, and causes the HMA to be mapped to a guest memory address (GMA). The guest accesses the file in the host memory with the GMA, and later terminates access to the file, where the filesystem daemon is then configured cause the GMA to be unmapped.

20 Claims, 9 Drawing Sheets

(51) Int. Cl.
*G06F 9/455* (2018.01)
*G06F 9/54* (2006.01)

(56) References Cited

U.S. PATENT DOCUMENTS

| | | | |
|---|---|---|---|
| 2008/0005447 A1* | 1/2008 | Schoenberg | G06F 12/109 |
| | | | 711/6 |
| 2016/0253193 A1* | 9/2016 | Tsirkin | G06F 9/45558 |
| | | | 718/1 |
| 2017/0123996 A1 | 5/2017 | Kishan et al. | |
| 2021/0072927 A1* | 3/2021 | Yang | G06F 3/0659 |

OTHER PUBLICATIONS

To Fuse or Not to Fuse: Performance of User-Space File Systems by Bharath Vangoor, et al.; 15 USENIX Conference on File and Storage Technologies; Feb. 27, 2017; pp. 59-72.

KVM: add virtio-pmemd driver by Pankaj Gupta; retrieved Oct. 31, 2018; available at https://patchwork.kernel.org/patch/10002207/; pp. 1-56.

\* cited by examiner

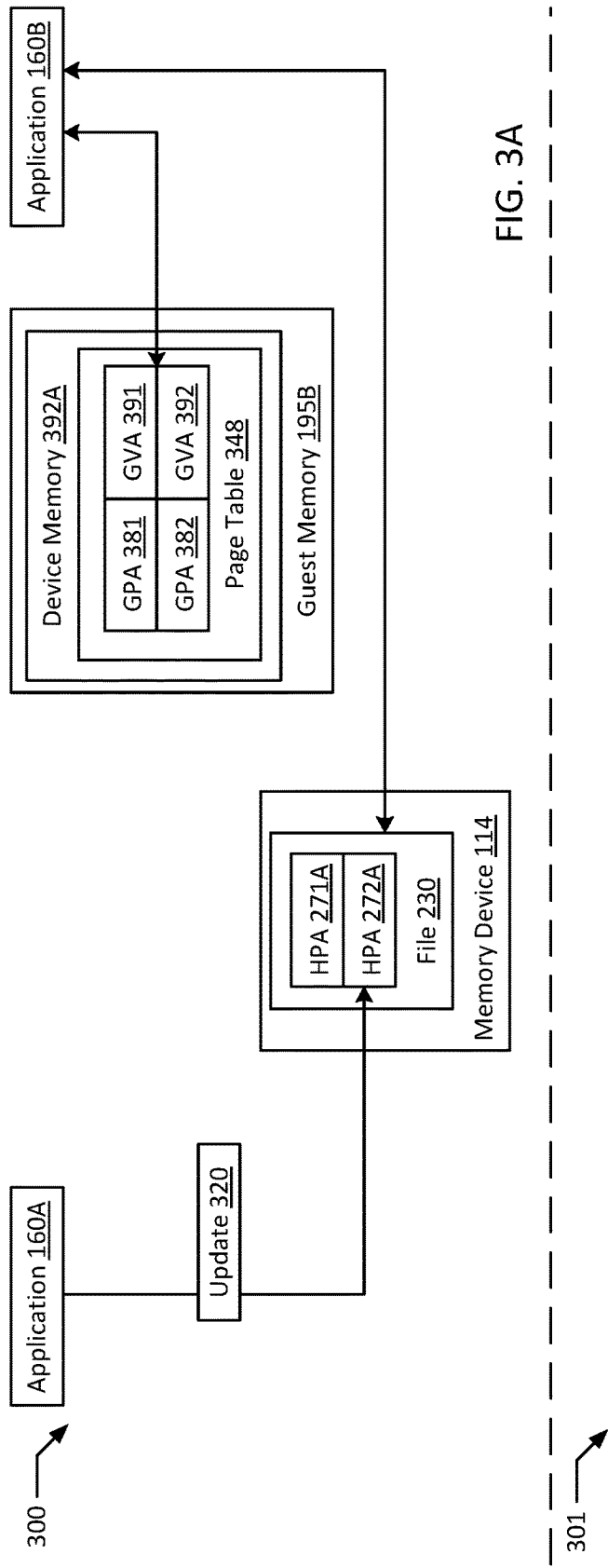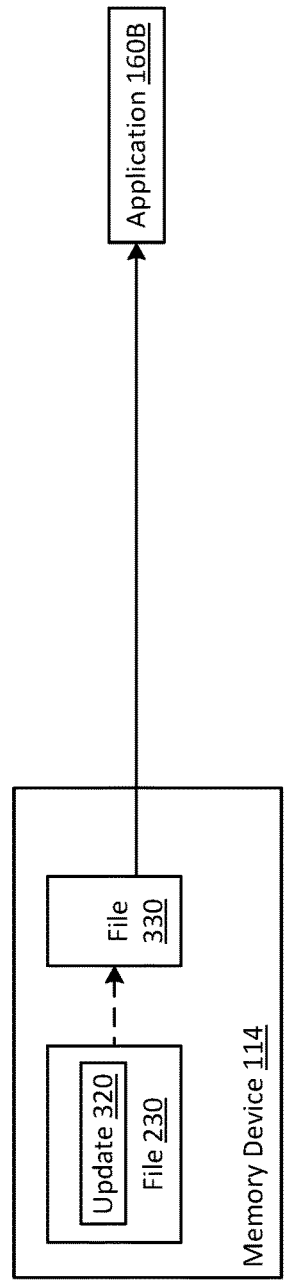
FIG. 3A
FIG. 3B

US 11,308,230 B2

DIRECT ACCESS TO HOST MEMORY FOR GUESTS

BACKGROUND

The present disclosure generally relates to virtualized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity, while isolating compute resources used by different users and tenants away from those of other users. Guests enable rapid scaling of application deployments to the volume of traffic requesting the applications, and allow applications to be deployed in a variety of hardware hosting environments. Multiple guests may also be clustered together to perform more complex functions than the respective guests are capable of performing individually. To interact with a broader set of users and a broader computing ecosystem, guests typically employ virtualized devices such as virtualized memory devices and virtualized input/output ("I/O") devices controlled by drivers.

SUMMARY

The present disclosure provides a new and innovative system, methods and apparatus for direct access to host memory for guests. In an example, a system includes a processor, a host memory, a filesystem daemon, a guest including a guest memory device and a storage controller, and a filesystem queue accessible to both the filesystem daemon and the storage controller. The storage controller is configured to receive a file retrieval request associated with a file stored in the host memory and forward the file retrieval request to the filesystem daemon by adding the file retrieval request to the filesystem queue. The filesystem daemon is configured to retrieve the file retrieval request from the filesystem queue, and cause a host memory address (HMA) associated with the file to be mapped to a guest memory address (GMA). The guest is configured to directly access the file in the host memory with the GMA, and later terminate access to the file, where the filesystem daemon is then configured cause the GMA to be unmapped.

Additional features and advantages of the disclosed method and apparatus are described in, and will be apparent from, the following Detailed Description and the Figures.

BRIEF DESCRIPTION OF THE FIGURES

FIGS. 3A-B are block diagrams illustrating a first application on a guest updating a file in host memory that is shared with a second application on a different guest according to an example of the present disclosure.

DETAILED DESCRIPTION OF EXAMPLE EMBODIMENTS

Figure 1:
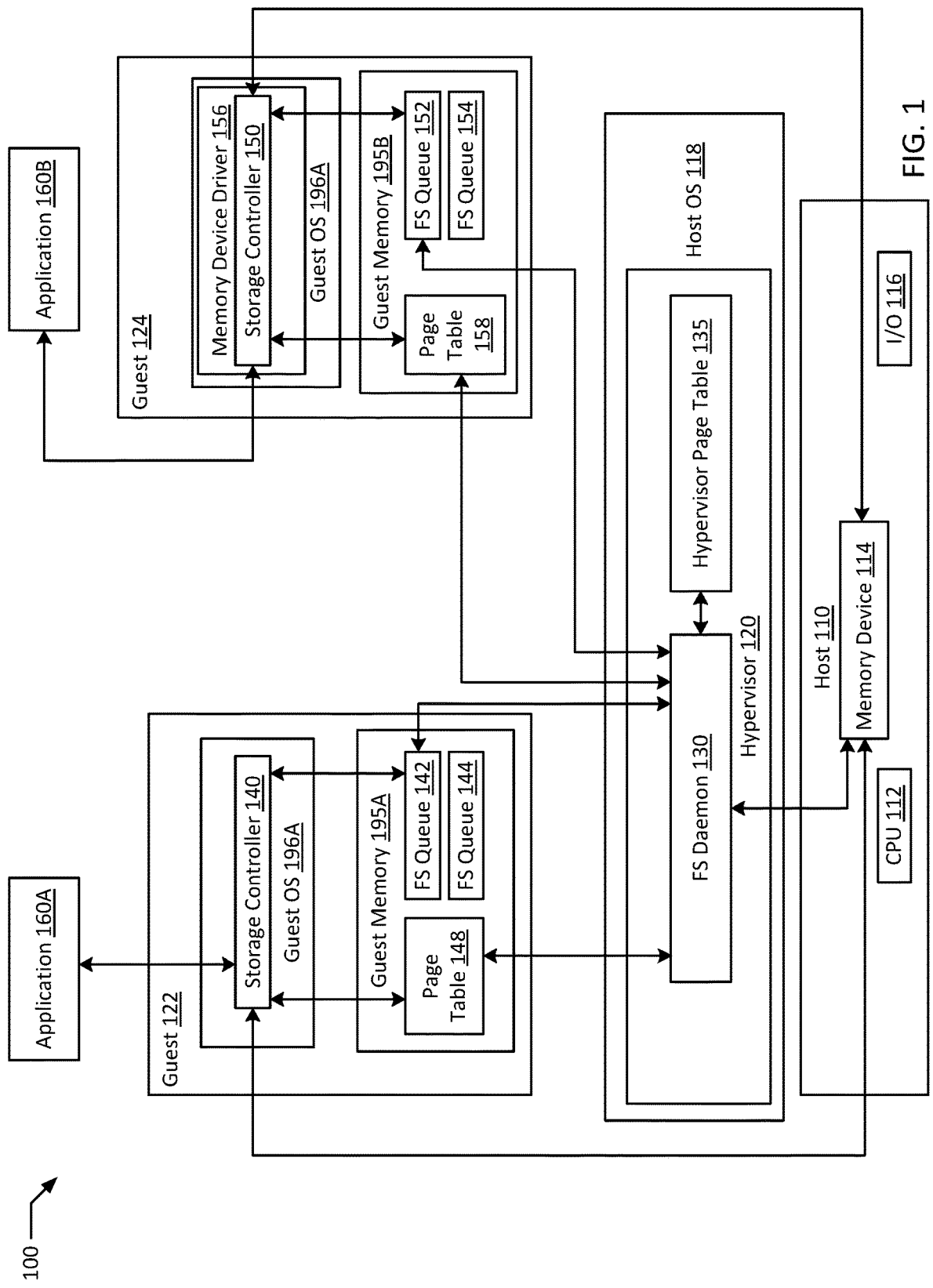
FIG. 1 is a block diagram of a system implementing direct access to host memory for guests according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.) and memory devices (e.g., transient memory (e.g., DRAM), hard drive disks ("HDD"), solid state drives ("SSD"), persistent memory (e.g., Non-Volatile Dual In-line Memory Module ("NVDIMM")), etc.). However, such access is typically restricted through a virtualization manager such as a hypervisor to ensure that virtual environments remain segregated and to prevent unauthorized access to the resources of other virtual environments on the same host, and/or unauthorized access to the host itself. In many cases, direct access to physical hardware, including physical I/O devices and memory, may be configured to require elevated access to prevent security risks from giving guest userspace components (e.g., applications executing without elevated rights) access to these physical components. For example, with rights to directly manipulate memory, a malicious user with limited user access to a system may be able to read the data of other accounts and/or execute destructive or other malicious code.

Guests deployed on the same host, whether physical or virtual, may often share certain characteristics. For example, these guests may share host specific configurations. These guests may also share processing tasks, for example, a first guest on the host may pass its results to a second guest for further processing. Therefore, it is often advantageous from a latency perspective to allow different guests on the same host system to share data through sharing memory access between the guests and also their host. For example, a host memory address may be mapped to two separate guests allowing both guests access to the data stored in the host memory address location. However, such access may present potential security risks, as isolating guests' memory access is often a key feature of allowing virtualized guests to operate as independent computing systems on the same hardware node. Therefore, even though memory sharing may be advantageous from a processing latency perspective, memory sharing implementations are typically less secure than communication via a networking protocol. For example, two systems that share access to the same memory will naturally also have a degree of control over each other's memory space (e.g., the shared memory addresses), which presents a possible vector for gaining unauthorized access to each other's memory contents. In a typical memory sharing implementation, a supervisor (e.g., kernel) of a source guest may typically require a degree of control over guest physical addresses (GPAs) of a destination guest in order to manage memory access to the memory addresses where the source guest has stored data. A supervisor of the destination guest may then map these GPAs to guest virtual addresses (GVAs) in the destination guest to allow programs in the destination guest to access this data. Shared memory access by guests hosted on the same system is typically provided by a hypervisor managing memory access for both the source and destination guests. However, in such an implementation, the source guest's kernel has elevated access to the destination guest's memory mappings creating a potential security risk. For example, having control over a destination guest's memory mappings typically requires that the source guest's kernel is able to instruct the hypervisor to perform memory operations outside of the source guest's memory space (e.g., in the destination guest's memory space), potentially including granting the source guest control over certain hypervisor page table entries. The potential security risks associated with sharing memory with other guests would be further elevated in scenarios where access is granted to host memory and not just memory of other guests. For example, a malicious actor who gains access to a guest with access to host memory may be able to read data stored by the host as well as other guests on the same physical system.

Virtualized guests may typically be implemented in several different ways (e.g., full virtualization, paravirtualization/hybrid virtualization, OS level virtualization). In fully virtualized systems, guests are unaware that they have been virtualized at all, and their guest operating systems issue hardware commands that are received by emulated hardware devices in the hypervisor. Fully virtualized systems allow for the greatest flexibility for running code in a guest that is incompatible with the host's operating system. In paravirtualization or hybrid virtualization models, at least some components in the guest know that the guest is virtualized, and rather than submitting hardware commands to a hypervisor, such guests are typically configured with drivers that pass software requests on to the hypervisor, allowing the hypervisor to interface with the hardware. Paravirtualized guests may be configured with virtual I/O devices (e.g., network devices, storage devices) that appear to applications executing on the guest as actual physical I/O devices, when, in actuality, these virtual devices are actually configured to forward I/O commands and messages to corresponding devices on the guest's host that actually interact with physical networking or storage devices. In these paravirtualized implementations, the guest operating system, or at least virtual devices and/or virtual device drivers, would typically be aware that the virtual devices are virtualized. The virtual devices would work in conjunction with their host's hypervisor to deliver enhanced performance in a paravirtualization model as compared to having the hypervisor fully emulate a device for the guest to use. Paravirtualization implementations include standards such as Virtio, Xen®, and VMWare Guest Tools®. OS level virtualization is most commonly implemented in the form of containers (e.g., Docker) where the guest is not configured to execute a full operating system, instead directly interfaces with its host's OS (e.g., for I/O operations). OS level virtualization incurs the least overhead, however, OS level virtualization requires that guests execute code that is compatible with their host's OS.

Programs, whether executing on a physical host or in a virtualized guest, may typically require some form of persistent storage (e.g., storage where data persists after a loss of power) to store current execution states of the programs. Persistent storage devices (e.g., HDDs, SSDs, persistent memory, etc.) may typically be configured with a filesystem that provides a structure for accessing and retrieving the data stored in the storage device. Operating systems, whether on a host or a guest, may additionally be configured with virtual filesystems, which provide an abstraction layer on top of hardware filesystems. Virtual filesystems may be implemented to provide a uniform interface for interacting with different hardware filesystems that may be implemented with incompatible interfaces. For example, Filesystem in Userspace ("FUSE") is a filesystem virtualization implementation that allows non-privileged users to create and mount virtual filesystems. FUSE is designed to provide less privileged accounts (e.g., non-privileged users) an interface to define file access rights without modifying privilege restricted code of supervisors (e.g., kernel code). In a typical FUSE implementation, a user file request is sent by a storage controller in the kernel back to a filesystem daemon executing in userspace to be processed. This allows a virtual filesystem defined in userspace to behave as if it is a filesystem directly controlling access to a storage device mounted to the kernel when a userspace application interacts with the virtual filesystem.

The present disclosure provides for access to host memory for guests while limiting security risks by passing memory access requests and commands through an indirect channel implemented by combining virtualized networking protocols with a virtualized filesystem. In an example, guests may be configured to access persistent storage devices by mounting a filesystem associated with a storage volume on the storage device. In the example, a paravirtualized storage device may be implemented in a guest, where the paravirtualized device (or its driver) is aware that it is a virtual device. In the example, communications between the paravirtualized virtual device and a hypervisor may be established via queues implemented in device memory allocated to the virtual device, where the queues are accessible to both the guest (e.g., via the virtual device's driver) and also to the hypervisor. These queues may be configured to pass software commands and data rather than hardware commands, since both the paravirtualized virtual device and the hypervisor are aware that the virtual device is virtualized.

A virtual filesystem implementation may be combined with a paravirtualized virtual storage device to effectively and securely provide access to files stored on another system (e.g., a separate guest, a host of a guest). By moving the filesystem daemon for a virtual filesystem implementation such as FUSE to the hypervisor controlling memory access for a guest, the filesystem daemon, instead of being restricted to accessing storage devices available to the guest, is instead granted access to any storage device, whether virtual or physical, available to the hypervisor. In an example, a virtual storage device on a guest includes a storage controller (e.g., FUSE client/driver) that reinterprets file requests made by a guest user to the guest kernel into a virtual filesystem request ("VFS request") (e.g., FUSE request). This VFS request is sent to a filesystem daemon ("FS daemon") on the host of the guest (e.g., in the hypervisor) via a virtual I/O protocol (e.g., Virtio). For example, FUSE requests may be packaged into Virtio messages placed in Virtio queues shared by the storage controller and FS daemon. The FS daemon may then be configured to interact with the host kernel, which performs memory address translation to locate and retrieve the data sought via the file request made by the guest user. The hypervisor (in conjunction with the guest kernel) provides security controls via access permissions to the requested data. Upon the host kernel locating the data and the hypervisor validating access rights, the data may be repackaged by the FS daemon into a message for the virtual I/O protocol (e.g., a Virtio message in a Virtio queue) returning the data to the virtual storage device and the guest kernel, which may then provide access to the retrieved copy of the data to the guest user requesting the data. Access may be similarly requested for data belonging to other guests, since the FS daemon would have access to the data of each guest executing on the host. Efficiency is achieved because paravirtualization protocols such as Virtio are well optimized for guest to host communications, while data security against malicious intrusion is maintained so long as the hypervisor or host kernel hosting the FS daemon can be trusted.

In some examples, passing data through virtual I/O protocols, while relatively secure, may incur unnecessary and/or unwanted file access latency. In an example, data access latency may be reduced and storage efficiency may be increased in such implementations by allowing guests to directly access files in host memory identified using the paravirtualization protocol after access permissions have been validated. For example, multiple file copying steps may be eliminated by giving a guest kernel and/or an application on a guest access to the copy of a file in a host directly. For example, transferring a file via virtual I/O protocol may entail multiple file copies (e.g., host memory to cache for packaging by the FS daemon, cache to filesystem queue to transmit to the guest, queue to guest kernel to remove the message from queue, and guest kernel into application cache for an application to manipulate). Direct access may reduce the required number of copies to two (e.g., the copy in host memory and a copy in cache being manipulated), and one of those copies (e.g., the cached copy) may be implemented with copy on write to further reduce memory capacity consumption. In such examples, using the paravirtualization protocol for file operational commands while allowing file content manipulations to occur through directly mapping host memory addresses into a guest's memory address space may provide a more optimal balance between access control, data security, and performance. For example, allowing direct access to host memory theoretically weakens the separation between guest and host. However, by enforcing that file operational commands, including commands to commit changes and retrieve files, are routed through the paravirtualization protocol, an additional level of security may be applied at the filesystem daemon level to prevent unauthorized file access or modification. Therefore, the presently disclosed systems and methods of direct access to host memory by guests allows for sharing data between a guest, its host, and other guests on the host, that is faster and more efficient while being at least similarly secure as compared with other data sharing techniques.

Other existing shared filesystem protocols such as NFS and 9PFS may also be extended to provide similar inter-system memory access to the proposed combination of extensions to Virtio and Fuse. Some of these implementations (e.g., NFS, 9PFS) may lack full POSIX compatibility, and therefore require applications to be developed with these protocols in mind, which significantly restricts backwards compatibility and inter-platform compatibility. Some of the flexibility in scalability offered by virtualization would therefore be limited. However, the example protocols (e.g., Virtio and Fuse), which are provided as illustrative examples only, allow for fairly straight forward implementations of the present disclosure as they are not full network filesystems and therefore do not have to fully support file operations across a network. Any suitable paravirtualization protocol may be combined with any suitable virtual filesystem protocol to implement the methods disclosed herein and systems configured to execute such methods.

FIG. 1 is a block diagram of a system implementing direct access to host memory for guests according to an example of the present disclosure. The system 100 may include one or more host(s) 110. In an example, host 110 is a physical host, with physical processors (e.g., CPU 112), physical memory device(s) (e.g., memory device 114), and physical I/O devices (e.g., I/O 116). Host 110 may also be a virtual machine with corresponding virtualized components. In either example, host 110 would appear to guests executing on host 110 (e.g., guests 122 and 124) as a physical host. As used herein, processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. For example, a network interface card may be an example of an I/O device through which host 110 and guests 122 and/or 124 hosted on host 110 communicates with external systems over a network. CPU(s) 112 may be interconnected using a variety of techniques, ranging from a point-to-point processor interconnect, to a system area network, such as an Ethernet-based network. Local connections within host 110, including the connections between processor 112 and a memory device 114 and between processor 112 and I/O device 116 may be provided by one or more local buses of suitable architecture, for example, peripheral component interconnect (PCI).

In an example, host 110 may host one or more guests, for example, guest 122 and 124. In an example guests may be VMs and/or containers, which may host additional nested layers of guests. For example applications 160A or B may be another virtual guest nested inside of guest 122 or 124. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may be a VM executing on host 110. In an example, guest 122 may be a container executing on a physical or virtual host (e.g., host 110). In addition, containers and/or VMs may further host other guests necessary to execute their configured roles (e.g., a nested hypervisor or nested containers). For example, a VM (e.g., guest 122) and/or a container may further host a Java® Virtual Machine ("JVM") if execution of Java® code is necessary.

System 100 may run one or more VMs (e.g., guest 122), by executing a software layer (e.g., hypervisor 120) above the hardware and below the guest 122, as schematically shown in FIG. 1. In an example, the hypervisor 120 may be a component of respective host operating system 118 executed on host 110. In another example, the hypervisor 120 may be provided by an application running on host operating system 118. In an example, hypervisor 120 may run directly on host 110 without an operating system beneath hypervisor 120. Hypervisor 120 may virtualize the physical layer, including processors, memory, and I/O devices, and present this virtualization to guest 122 as devices, including virtual central processing units, virtual memory devices, virtual input/output devices, and/or guest memory 195A. In an example, guest 124 may be a similar guest to guest 122, hosting a second copy of application 160A (e.g., application 160B).

Guests 122 and 124 may run on any type of dependent, independent, compatible, and/or incompatible applications on the underlying hardware and host operating system 118. In an example, a container or application (e.g., applications 160A-B) running on guests 122 and 124 may be dependent on the underlying hardware and/or host operating system 118. In another example, a container or application (e.g., applications 160A-B) running on guests 122 and 124 may be independent of the underlying hardware and/or host operating system 118. In an example, a container or application (e.g., applications 160A-B) running on guests 122 and 124 may be compatible with the underlying hardware and/or host operating system 118. Additionally, a container or application (e.g., applications 160A-B) running on guests 122 and 124 may be incompatible with the underlying hardware and/or OS. The hypervisor 120 may manage memory for the host operating system 118 as well as memory allocated to the guests 122 and 124 and guest operating system 196A-B such as guest memory 195A-B provided to guest OSes 196A-B. In an example, any form of suitable network for enabling communications between computing devices, for example, a public network (e.g., the Internet), a private network (e.g., a local area network (LAN) or wide area network (WAN)), or a combination thereof may be employed to connect host 110, guests 122 and 124, and/or to other computer systems.

In an example, hypervisor 120 allocates respective sections of host memory in memory device 114 as dedicated device memory for guest memory devices (e.g., guest memories 195A and 195B). In an example, guest OS 196A and applications executing on guest 122 (e.g., application 160A) access guest memory 195A via storage controller 140. In an example, guest OS 196B and applications executing on guest 124 (e.g., application 160B) access guest memory 195B via storage controller 150, which is a component part of memory device driver 156 associated with guest memory 195B. In an example, guest memories 195A-B are virtual memory devices implemented on guests 122 and 124 respectively. In the example, these virtual memory devices are configured to provide access for guests 122 and 124 to data in memory device 114 of host 110 and/or to each other's memory spaces. In an example, the device memory allocated to guest memories 195A by hypervisor 120 is also virtualized to allow guest 122 to access those memory addresses. In an example, filesystem queues (e.g., FS queues 142, 144 and FS queues 152, 154) are added to the device memory. In an example, FS queues 142 and 144, being stored in device memory for the guest memory device of guest memory 195A, are accessible to both the guest 122 as well as hypervisor 120, including by FS daemon 130. Therefore FS queues 142 and 144 provide a communication channel between guest 122 and FS daemon 130. FS queues 152 and 154 similarly provide a communication channel between guest 124 and FS daemon 130.

In typical computer systems, there may be more data referenced by executing applications (both applications executing on physical hardware and those in virtualized guests on the physical hardware) than the amount of random access memory available on the system. Typically, memory virtualization is implemented to allow memory to be shared among these various processes. For example, data may be loaded to memory when it is needed for a program to execute, and then moved to slower storage such as hard disk when the data is not being accessed. In an example, memory paging is implemented to track the virtual addresses of the data of executing applications. A given memory address may be referenced by any number of virtual addresses. Page tables that perform lookups to translate between virtual and physical memory addresses may be implemented with granular access controls, such that a given execution context (e.g., guest user, guest kernel, host user, host kernel) may access only those memory locations that it has permission to access. In an example, page tables 148 and 158 provide translation of virtualized guest memory addresses (e.g., between guest virtual addresses ("GVA") and guest physical addresses ("GPA")), while hypervisor page table 135 provides translation between GPAs or host virtual addresses ("HVA") and host physical addresses ("HPA"). In some systems an extra layer of translation may be implemented between GPAs and HVAs.

In an example, file operation requests (e.g., OPEN, READ, DELETE, CLOSE, RELEASE, WRITE, COMMIT, UPDATE, etc.) from an application 160A executing in guest 122's user space (e.g., an unprivileged application) may be sent to guest OS 196A (e.g., guest 122's privileged kernel). Guest OS 196A forwards the file operation to storage controller 140 in guest 122 associated with guest memory 195A (e.g., a virtual storage device), which converts the request into a format compatible with FS daemon 130 in hypervisor 120. This converted request is then sent to FS daemon 130 via FS queue 142. FS daemon 130 requests hypervisor 120 to translate the file request to a host memory address of the file being requested (e.g., via hypervisor page table 135). Access permissions to the requested file stored in memory device 114 may be validated by guest OS 196A, storage controller 140, FS daemon 130, and/or hypervisor 120. Upon identifying the host memory address of the file, this host memory address may be mapped to a GPA by the hypervisor 120 (e.g., by FS daemon 130) in hypervisor page table 135. In an example, where the file is stored in a persistent storage device but is not currently stored in random access memory, the host memory address may be a host memory address allocated to store the file in random access memory in response to a page fault generated from an attempt to retrieve the file's contents (e.g., by guest 122). This GPA may then be mapped to a GVA in page table 148 allowing guest 122 to access the file in memory device 114 by accessing the GVA in page table 148. In an example, additional file operations (e.g., committing changes to persistent memory via msync( ) transferring buffered updates data to HDD/SSD via fsync( )) made to the file may also be passed through FS queue 142 and/or FS queue 144.

Figure 2A:
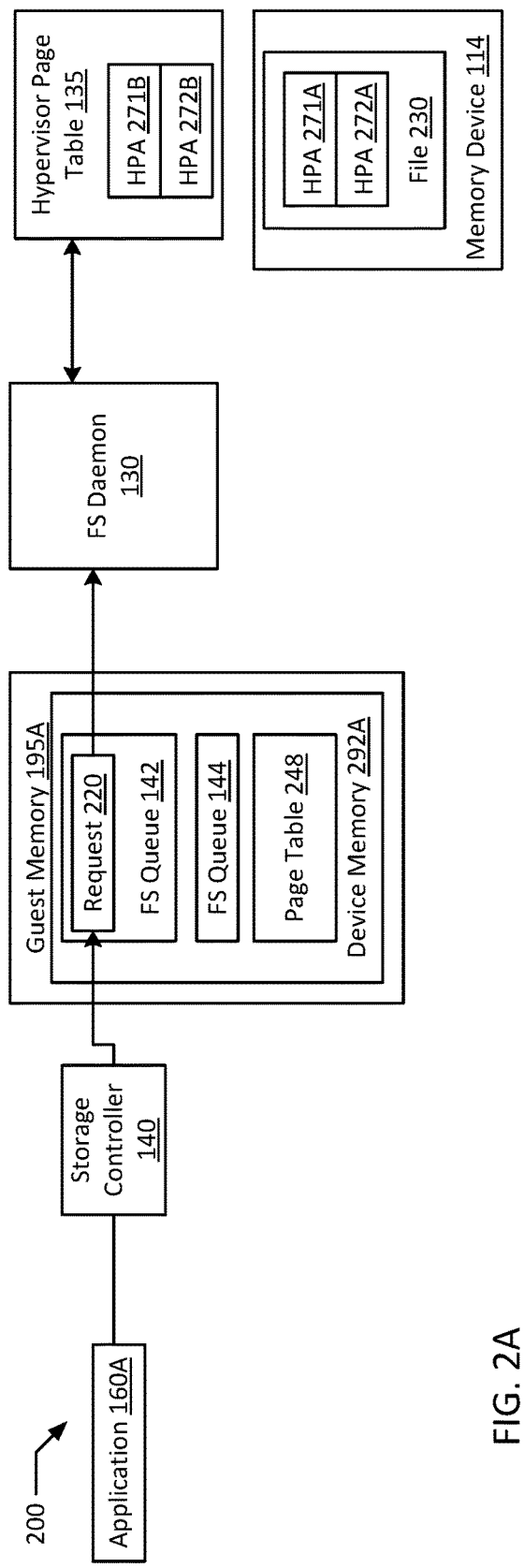
FIGS. 2A-B are block diagrams illustrating an application in a guest being provided access to a file in a host memory device according to an example of the present disclosure.
Figure 2B:
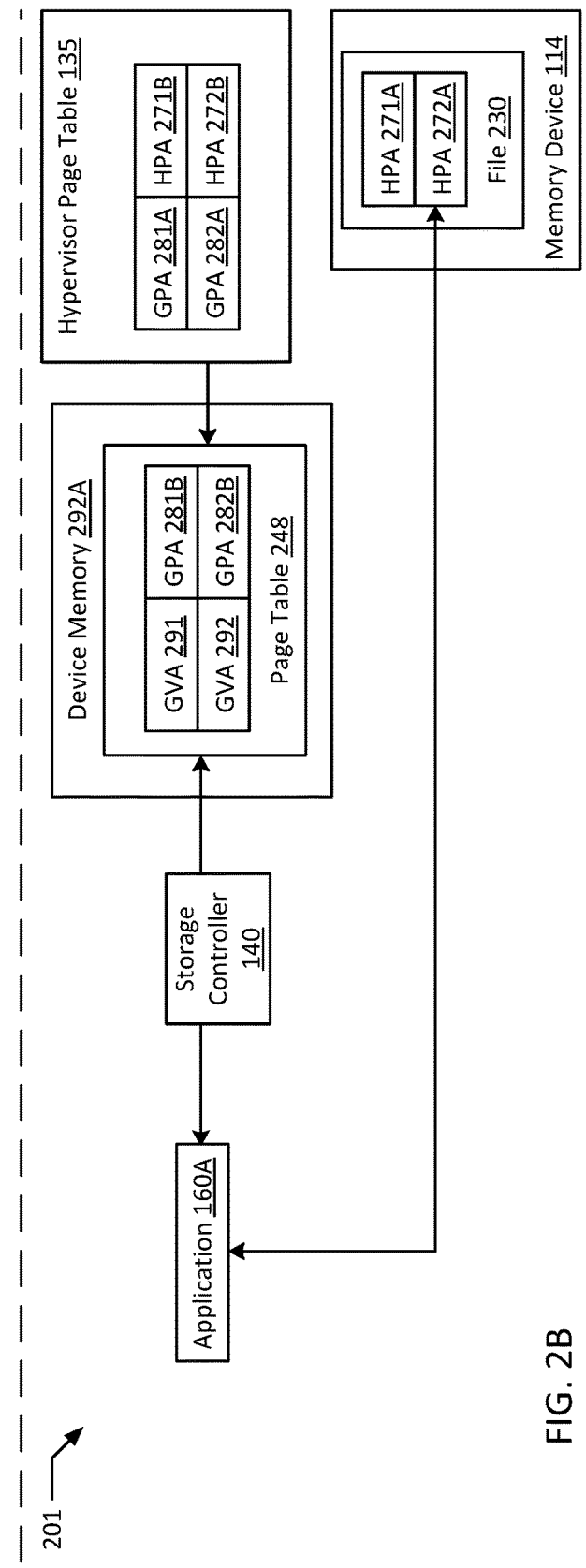

FIGS. 2A-B are block diagrams illustrating an application in a guest being provided access to a file in a host memory device according to an example of the present disclosure. In system 200 depicted in FIG. 2A, application 160A requests access to file 230 in memory device 114, and storage controller 140 executes in conjunction with FS daemon 130 to locate file 230 for retrieval. In an example, application 160A first sends a file request to storage controller 140 (e.g., open file /etc/host.conf) to retrieve a networking configuration file associated with host 110. Guest OS 196A determines that the /etc directory is located in a filesystem mounted as guest memory 195A, and that access to guest memory 195A is provided via storage controller 140. In an example, storage controller 140 is a component of a virtual storage device providing a storage volume accessible to guest 122 (e.g., guest memory 195A). In another example, storage controller 140 is a component of a driver for the virtual storage device executing in guest OS 196A. Guest memory 195A may be implemented with a reserved device memory 292A in which a plurality of filesystem queues (e.g., FS queues 142, 144, and 242) and page tables (e.g., page table 248) are stored. In an example, storage controller 140 takes the file request sent from application 160A to guest OS 196A, and translates the request. For example, translation may include packing the request into a message envelope compatible with FS queue 142 (e.g., a Virtio message). In addition, translation may include converting the file request received by guest OS 196A into a filesystem request format accepted by FS daemon 130 (e.g., a FUSE_OPEN or FUSE_OPENDIR request). In an example, storage controller 140 may be configured to perform translation similarly to a typical FUSE implementation where the FUSE daemon would be located in the userspace of guest 122, but the translation output may be redirected to FS daemon 130 in hypervisor via FS queue 142 in the form of request 220. In an example, FS daemon 130 is configured to retrieve messages from FS queues 142 and 144. For example, FS daemon 130 may subscribe to alerts of memory modifications in the memory addresses associated with FS queues 142 and 144 generated by hypervisor 120 and/or host OS 118. In an example, upon receiving request 220, FS daemon 130 removes any transmission protocol related wrapper (e.g., Virtio wrapper) on the filesystem request to receive the filesystem request. FS daemon 130 then converts the request into a memory access request to hypervisor 120. For example, hypervisor 120 may be a virtual machine monitor (e.g., Quick Emulator ("QEMU")) that performs memory lookup, address translation, and address mapping to provide access to files in host memory. In the example, FS daemon 130 requests the file requested by application 160A (e.g., the host.conf configuration file) from hypervisor 120. In the example, hypervisor 120 locates file 230 in memory device 114 via page table lookup in hypervisor page table 135. In the example, file 230 is determined to be located at HPAs 271A and 272A, represented in hypervisor page table 135 as corresponding HPAs 271B and 272B. The hypervisor 120 validates application 160A, guest OS 196A, and/or FS daemon 130's access permissions to the HPAs 271B and/or 272B. In an example, file 230 may reside in persistent storage (e.g., HDD, SSD) but not in random access memory. In such an example, file 230 may be associated with one or more host virtual addresses, but not necessarily a host physical address. In such an example, when FS daemon 130 requests that file 230 be mapped to guest memory 195A, hypervisor 120 may map the host virtual address(es) of file 230 to guest physical addresses of guest 122 (e.g., GPA 281A, 282A), which may in turn be mapped to GVA 291 and/or 292. In the example, when guest 122 attempts to access GVA 291, a page fault is triggered because file 230 does not reside in random access memory and is not yet associated with a host physical address. Host 110 (e.g., host OS 118, hypervisor 120) then handles the page fault by allocating HPAs 271A and/or 272A to file 230, retrieves file 230 from persistent storage, and loads file 230 into HPAs 271A and/or 272A. In the example, with the page fault resolved, guest 122 accesses file 230 directly via HPAs 271A and/or 272A.

In various examples, multiple layers of file access control may be implemented. For example, guest OS 196A may first validate that application 160A has access to the requested file (e.g., the /etc/host.conf configuration file). In an example, after such validation, storage controller 140 may send a filesystem request to FS daemon 130 with the credentials of guest OS 196A (e.g., the guest kernel). FS daemon 130 may then validate that guest OS 196A has access to the files represented in the filesystem of guest memory 195A, including the /etc/host.conf executable. Hypervisor 120 may then validate that FS daemon 130, and/or guest OS 196A has access to the HPAs 271B and/or 272B of the file 230 in memory device 114. In an example, when guest 122 attempts to open file 230, or when FS daemon 130 requests for file 230 to be mapped to guest 122's address space, hypervisor 120 and/or host OS 118 determines whether or not FS daemon 130 has sufficient rights to open file 230. In an example, host OS 118 may additionally determine whether or not hypervisor 120 is permitted to map HPAs 271A and/or 271B to the guest address space of guest 122. In an example, storage controller 140, FS daemon 130, and/or hypervisor 120 may reject a file request based on access permissions associated with a file being retrieved. In an example, rejection of a file request may include logging the attempted file request and/or generating an error message related to the rejected file request. In an example, filesystem daemon 130 and/or hypervisor 120 rejects a different file retrieval request to access a different file based on access permissions associated with the different file.

System 201 illustrated in FIG. 2B is a later state of system 200 after FS daemon 130 is provided access to file 230A by hypervisor 120. In an example, hypervisor 120 (e.g., via FS daemon 130) provides access to file 230 to guest 122 by mapping file HPAs 271B and/or 272B to corresponding GPAs 281A and/or 282A in hypervisor page table 135. These GPAs 281A and/or 282A are then mapped to corresponding GVAs 291 and/or 292 in page table 248 in device memory 292A associated with the guest memory device of guest memory 195A. In an example, FS daemon 130 provides notice of the mapping of GPAs 281A/282A and/or GVAs 291/292 to storage controller 140 (e.g., via FS queues 142 and/or 144). In an example, storage controller 140 then provides access to file 230 to application 160A via GVA 291 and/or 292. In an example, application 160A only requests access to a segment of file 230, in which case only a segment of file 230 (e.g., corresponding to HPA 272A, GPA 282A, and GVA 292) is provided to application 160A. In an example, guest OS 196A may further map GPAs 281B and/or 282B, or GVAs 291-292 to a memory address space of application 160A (e.g., via an additional page table and additional GVAs). In an example, a copy of file 230 may be cached by guest OS 196A for manipulation by application 160A. In an example this copy of file 230 may be a full copy or a copy on write copy.

In an example, systems 100, 200, and 201 share a virtual storage device associated with guest memory 195A. In an example, this virtual storage device may be initialized by hypervisor 120 receiving a request to initialize a guest memory device in a guest 122. In the example, the guest memory device (e.g., a virtual device hosting guest memory 195A) is configured to provide access to files in a host memory (e.g., memory device 114) to guest 122. In an example, a request to mount a virtual file system associated with memory device 114 to guest 122 may be received by hypervisor 120. In an example, requested guest memory 195A may be configured to appear to application 160A as storage provided by a PCI device.

The hypervisor 120 allocates device memory 292A associated with the guest memory device. In an example, hypervisor 120 reserves a section in host memory (e.g., memory device 114) as device memory 292A associated with a guest memory device that will be mounted to guest 122 provide storage as guest memory 195A to guest 122. In the example, the device memory 292A is reserved for virtual device usage, for example, for communications queues (e.g., FS queues 142 and 144, and page table 248) which will allow a storage controller (e.g., storage controller 140) of the new guest memory device to communicate with FS daemon 130 in hypervisor 120.

The hypervisor 120 creates a first plurality of queues (e.g., represented by FS queue 142) and a different second plurality of queues (e.g., represented by FS queue 144) in the device memory 292A. In an example, a filesystem daemon (e.g., FS daemon 130) of the hypervisor 120 is configured to receive messages from both the first plurality of queues (e.g., low priority queues, represented by FS queue 142) and the second plurality of queues (e.g., high priority queues, represented by FS 144). In an example, low priority queues (e.g., FS queue 142) handle file content requests, through which the contents of a file are retrieved for processing, while high priority queues (e.g., FS queue 144) handle file operations requests (e.g., rename, move, delete a file, cancel a previous request, etc.) and/or metadata requests (e.g., requests fulfilled via metadata queries for directory listings, modification times, file existence, etc.) which do not require access to file contents. In an example, a later received file operations request or metadata request may be processed by FS daemon 130 before an earlier received file content request completes processing. In an example, FS daemon 130 and storage controller 140 are configured to receive messages placed in the FS queues 142 and 144 in device memory 292A, and also configured to be permitted to place messages into these queues. In an example, storage controller 140 executes in a kernel of guest 122 (e.g., guest OS 196A). In an example, storage controller may execute as a component of the virtualized guest memory device hosting guest memory 195A, or as a component of a driver of the virtualized guest memory device executing in guest OS 196A.

FIGS. 3A-B are block diagrams illustrating a first application on a guest updating a file in host memory that is shared with a second application on a different guest according to an example of the present disclosure. In an example, system 300 as illustrated by FIG. 3A is a later execution state of system 201. In the example, access to file 230 (e.g., /etc/host.conf) is shared by both guests 122 and 124 on which two copies of a network connected application (e.g., applications 160A-B) execute. In an example, both applications 160A and 160B are actively accessing file 230. In an example, GPAs 381 and 382 are also mapped in hypervisor page table 135 to HPAs 271A and 272B corresponding to file 230. In the example, application 160B accesses file 230 via GVAs 391 and 392 mapped to GPA 381 and 382 in page table 348 in device memory 392A of guest memory 195B of guest 124 (e.g., via storage controller 150). In an example, application 160A modifies file 230 with update 320. In an example, update 320 is made to a section of file 230 stored in HPA 271A. In an example, to commit update 320 to memory device 114, application 160A sends a COMMIT command to guest OS 196A, which sends the command to storage controller 140. In the example, storage controller 140 translates the COMMIT request to a FUSE request sent to FS daemon 130 via FS queue 144 (e.g., a high priority queue). FS daemon 130 then executes a memory synchronization command (e.g., msync( ) fsync( )) which causes data updates associated with HPA 271A to be flushed from CPU caches on host 110, and then a fence operation to commit update 320 to memory device 114. In an example, while a flush and/or fence operation is being executed, changes to file 230 and HPAs 271A and 272A are restricted (e.g., application 160B may not simultaneously modify file 230). A flush operation forces any pending changes to file 230 out of CPU 112 prior to committing the changes in memory device 114.

In an example, system 301 as illustrated by FIG. 3B is a later execution state of system 300. In an example, file 230, updated with update 320 becomes file 330. In the example, the updated file 330 is immediately read by application 160B which is also actively reading file 330. In an example, update 320 (e.g., an updated networking setting) immediately impacts an execution state of application 160B. For example, the updated networking setting is applied to all subsequent processing performed by application 160B. In an example where application 160B executes with a cached local copy of file 230, an update to the cached copy may be triggered by FS daemon 130 and/or hypervisor 120 based on update 320 being committed to persistence in memory device 114. In an example, FS daemon 130 sends a request via FS queue 152 or 154 for the cached copy of file 230 on guest 124 to be updated. In another example, hypervisor 120 remaps GPA 381, GPA 382, GVA 391, and/or GVA 392 triggering guest OS 196B to recognize the updated file 330. In an example, application 160A may access only part of file 230 (e.g., HPA 271A) and not the whole file 230 (e.g., HPAs 271A and 272A). In the example, update 320 made to the part of file 230 (e.g., HPA 271A) being accessed by application 160A is still reflected in an execution state of application 160B which may be accessing the entire file 230 (e.g., HPAs 271A and 272A).

Figure 4:
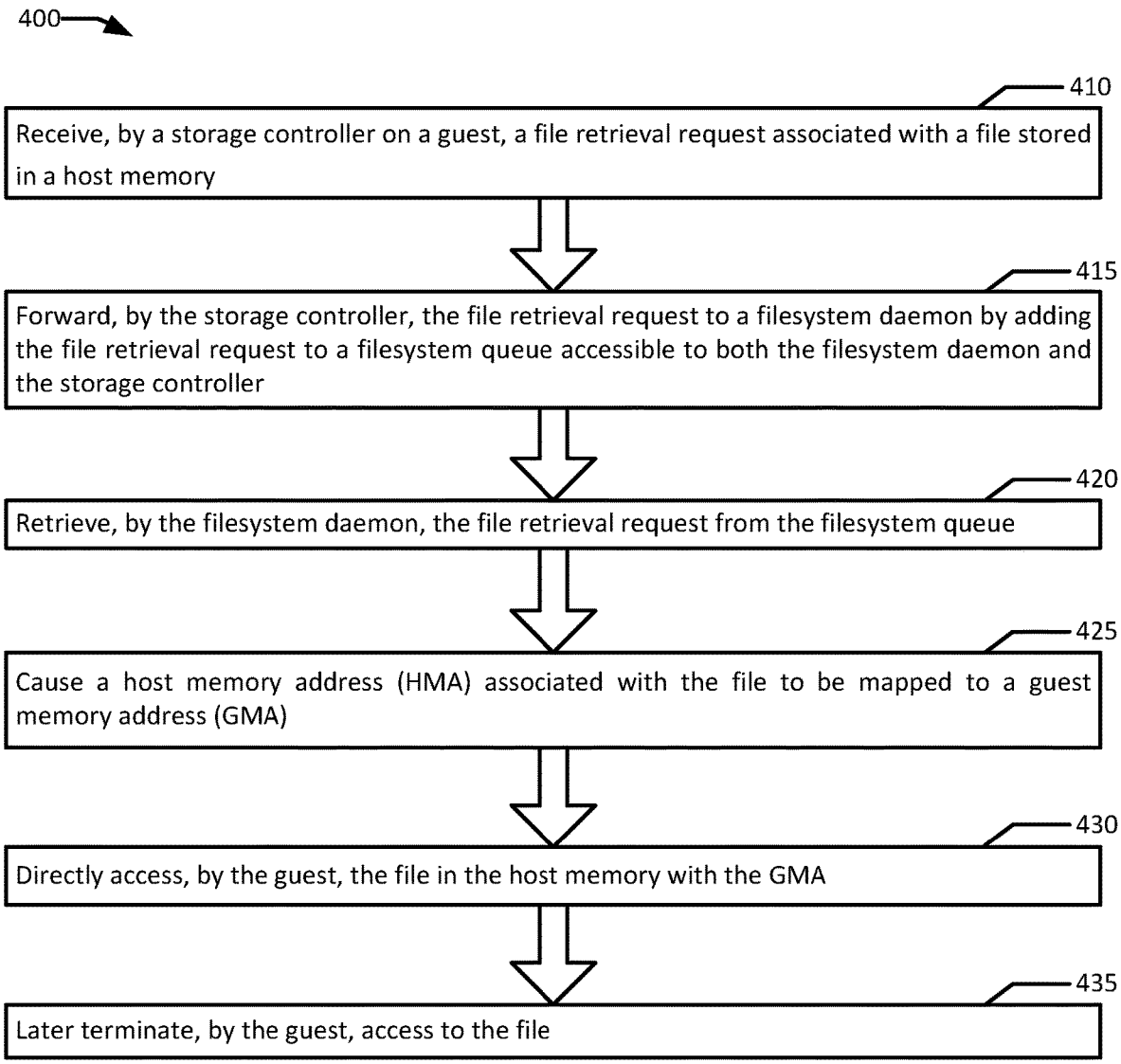
FIG. 4 is a flowchart illustrating an example of accessing a file in host memory by a guest according to an example of the present disclosure.

FIG. 4 is a flowchart illustrating an example of accessing a file in host memory by a guest according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a storage controller 140 and a FS daemon 130.

Example method 400 may begin with receiving, by a storage controller on a guest, a file retrieval request associated with a file stored in a host memory (block 410). For example, storage controller 140 in guest 122 receives a file retrieval request from application 160A. In an example, a file request may include any valid file operation recognized by guest OS 196A (e.g., OPEN, READ, DELETE, CLOSE, RELEASE, WRITE, COMMIT, UPDATE, etc.), and a file retrieval request may be any valid file operation that requires access to a file's contents to fulfill (e.g., a request that cannot be fulfilled by performing a metadata operation). In an example, guest OS 196A recognizes that application 160A requested a file operation on a file 230 in a virtual filesystem associated with a storage volume mounted as guest memory 195A, access to which is controlled by storage controller 140. In an example, storage controller 140 is a component of a guest memory device associated with guest memory 195A. In another example, storage controller 140 is a component of a driver for the guest memory device executing on guest OS 196A. In an example, guest memory 195A is configured to provide access to files (e.g., file 230) stored in host memory (e.g., memory device 114). In an example, the mounted guest memory device associated with guest memory 195A appears to application 160A as a physical storage device, for example, a peripheral interconnect ("PCI") device. In an example, guest memory 195A is configured to provide access to files in memory device 114 by implementing a virtual filesystem that exposes a section of a filesystem associated with host OS 118 and memory device 114 to guest 122. In the example, files referenced through the virtual filesystem associated with guest memory 195A may be accessed by guest 122 via file operations directed at file identifiers (e.g., file descriptors, file handles) of these referenced files. In some examples, the file request may additionally identify a part of a file on which the file operation is to be performed rather than a whole file, for example, via an offset value from the start of the file. In such examples, instead of a request to, for example, retrieve a whole file for access or modification, a segment of the file is identified and retrieved. For example, an offset representing the beginning of the identified segment of the file in relation to the beginning of the file is identified. This offset identifies a starting position of the requested segment, and is passed on to FS daemon 130, which includes the offset in requesting the hypervisor 120 to determine the host memory address (e.g., HPA 272A) corresponding to the start of the segment of the requested file (e.g., file 230) requested by application 160A. In such an example, rather than mapping a host memory address (e.g., HPA 271A) corresponding to the beginning of the requested file, the host memory address mapped to provide access to file 230 is adjusted with an identified memory offset (e.g., an offset from the beginning of a page or block of memory in memory device 114). This adjusted host memory address corresponding to the identified segment of file 230 may be mapped instead (e.g., HPA 272A). In an example, application 160A may request, and may be provided with, access to only part of file 230 (e.g., corresponding to HPA 272A).

The storage controller forwards the file retrieval request to a filesystem daemon by adding the file retrieval request to a filesystem queue accessible to both the filesystem daemon and the storage controller (block 415). In an example, storage controller 140 takes the file retrieval request from guest OS 196A and forwards the file retrieval request to FS daemon 130 by adding the file retrieval request to FS queue 142. In some examples, the file retrieval request from guest OS 196A may be incompatible with FS daemon 130, and storage controller 140 may be required to perform some translation to the request. For example, storage controller 140 translates the operating system file request received by guest OS 196A into a virtual filesystem request in a format acceptable to FS daemon 130 (e.g., a FUSE request). For example, a file OPEN request may be translated to a FUSE_OPEN or FUSE_OPENDIR request, a file READ request may be translated to a FUSE_READ or FUSE_READDIR request, etc. In an example, storage controller 140 also the translated file request (e.g., a virtual filesystem request) to FS queue 142. In an example, adding a the translated file request to FS queue 142 may include additional translation, for example, packaging the translated file request into a message envelope format acceptable to the transport protocol implemented for FS queue 142 (e.g., a Virtio message). In an example, multiple pluralities of queues may be implemented for message transport between storage controller 140 and FS daemon 130. For example, low priority queues (e.g., FS queue 142) may be implemented to handle file content requests (e.g., FUSE_READ, FUSE_WRITE, etc.), while high priority queues (e.g., FS queue 144) may be implemented to handle instructional requests (e.g., FUSE_INTERRUPT, etc.) and/or metadata requests (FUSE_GETATTR, FUSE_LOOKUP, etc.). For example, an interrupt command may be sent on FS queue 144 to stop a file content retrieval request sent via FS queue 142.

Typically, in UNIX® operating systems and their derivatives (e.g., Red Hat Enterprise Linux®, AIX®, Solaris®, etc.) everything that the operating system interacts with is defined as a type of file, including I/O devices and storage devices. I/O devices are typically exposed as character devices, which when read, display a continuous stream of characters. For example, a keyboard character device would display the characters typed on the keyboard. Buffering may be implemented to display whole messages rather than a stream of characters (e.g., for a network device that assembles multiple packets into one message). Block devices are typically storage devices that retrieve entire blocks or pages of data from a storage device at once. In a character device, data would be read as it is sent to the device (e.g., a second message may be interjected into the middle of a larger first message as an interrupting communication). In an example, communication between storage controller 140 and FS daemon 130 is routed through FS queues 142 and 144 rather than directly through a device file (e.g., a character or block device) as would be the case where FS daemon 130 were executing within guest 122. In such an example, because data in FS queues 142 and 144 are read sequentially as whole messages, a message that takes a long time to compose may block subsequent messages from appearing on the queue. Therefore a high priority request from storage controller 140 to FS daemon 130 that is intended to interrupt a low priority request or to be executed before or in parallel to the low priority request cannot be sent via the same communication channel as a the low priority request. This means that, if the same communication channel were used (e.g., FS queue 142) an interrupting high priority request would not be received until the low priority request submitted to the queue before the high priority request finishes transmitting. Therefore a second queue (e.g., FS queue 144) may be implemented to support high priority requests. For example, if a file retrieval request is sent on FS queue 142, followed by a subsequent file retrieval request also to FS queue 142, sending a cancellation request to cancel the first file retrieval request on FS queue 142 while the FS daemon 130 is executing the first file retrieval request may be useless because the cancellation request would not be processed until after the second file retrieval request. In an example, a processing efficiency optimization may include rerouting file requests that can be handled by metadata operations (e.g., without retrieving the contents of a file) to high priority queues so that requests to locate a file, acquire a lock on a file, or retrieve information such as modification time do not have to wait for an ongoing file content retrieval request to finish executing. In addition, interrupting commands (e.g., to cancel or terminate file access) may also be routed to higher priority queues.

The filesystem daemon retrieves the file retrieval request from the filesystem queue (block 420). In an example, FS daemon 130 retrieves the translated file retrieval request (e.g., request 220) from FS queue 142 for processing. In the example, FS daemon 130 may unpack request 220 from a transport layer messaging protocol envelope to retrieve request contents for processing. In an example, request 220 includes several parameters related to file 230. For example, request 220 may include a file handle to identify file 230, an offset within file 230 locating the portion of file 230 guest 122 intends to retrieve, and an identifier for a range of available guest virtual memory addresses where file 230 may be mapped to allow guest 122 to access file 230. In an example, FS daemon 130 may separately fulfill a high priority file request transmitted through FS queue 144 while in the process of fulfilling the file content request 220 transmitted through FS queue 142. For example, a multi-threaded FS daemon 130 may handle the two requests in parallel. In an example the high priority request may be fulfilled via a metadata operation (e.g., retrieving a file modification time of a second file). In an example, results of this second request may be supplied via high priority filesystem queue FS 144, or through a separate queue. In an example, usage of separate queues for inbound and outbound communications between storage controller 140 and FS daemon 130 may reduce messaging contention in high volume systems.

In an example, hypervisor 120, or a component of hypervisor 120 (e.g., FS daemon 130) determines a host memory address of file 230 (e.g., HPA 271A and/or HPA 272A), for example, in response to a file operation performed by FS daemon 130 based on receiving request 220. In an example, FS daemon 130 sends a file operation to host OS 118 in response to receiving the file retrieval request from FS queue 142 to retrieve file 230. In an example, FS daemon 130 issues a file request to a supervisor of host 110 (e.g., hypervisor 120 and/or host OS 118) which is handled by the supervisor by converting the file request (e.g., to access a file based on a file descriptor or file handle) into a memory request (e.g., to retrieve a block or page of memory). In an example, hypervisor 120 allocates a host memory location identified by a host memory address (e.g., HPA 271A) to store the requested file, which may be retrieved from persistent storage. In the example, hypervisor 120 performs memory address translation to identify that HPA 271A is the memory address of the start of file 230. In an example, HPA 271A includes an offset from the beginning of a block or page on which file 230 is stored (e.g., where file 230 does not start at the beginning of a block or page). In an example, HPA 271A is an HPA allocated by hypervisor 120 for storing file 230, which is retrieved from a persistent storage device (e.g., HDD, SSD) in response to the contents of file 230 being requested (e.g., by guest 122).

The FS daemon causes a host memory address (HMA) associated with the file to be mapped to a guest memory address (GMA) (block 425). In an example, FS daemon 130 and/or hypervisor 120 may be configured to directly map the host memory address of file 230 (e.g., HPA 271A) into the guest memory address space of guest 122 (e.g., in hypervisor page table 135 as GPA 281A). In such an example, guest 122 may be provided direct access to modify the copy of file 230 in memory device 114 without creating a local copy in guest memory 195A. Avoiding creating additional copies of file 230 may provide lower file access latency as well as conserve memory capacity. However, allowing a guest to directly modify host memory may potentially introduce additional security concerns and requires a higher level of trust between hypervisor 120 and guest supervisors (e.g., guest OS 196A). In addition, in some implementations higher performance may also be achieved by opening files while bypassing page cache operations (e.g., FOPEN_DIRECT_IO). In an example, by mapping HPA 271A directly into guest 122's memory space as GPA 281A, file 230 does not need to be retrieved or cached into host virtual memory for FS daemon 130 to package and send file 230 as a message through FS queues 142 or 144, saving at least one copy operation. In addition, GPA 281A may be mapped into an address space of application 160A (e.g., as GVA 291). In such an example, the guest 122's page cache may also be avoided, therefore further reducing latency and memory capacity usage. In an example, FS daemon 130 determines a file to be mapped (e.g., file 230) based on request 220. In the example, FS daemon 130 opens a file identifier (e.g., a file descriptor and/or inode associated with host OS 118) for file 230, and passes the file identifier to hypervisor 120 for hypervisor 120 to perform memory mapping in hypervisor page table 135 and/or guest page table 248. In an example, hypervisor 120 locates file 230 in memory device 114 or another memory device (e.g., DRAM, HDD, SSD, persistent memory) associated with host OS 118 based on the file identifier. In an example, hypervisor 120 may execute a mmap( ) call to map all or part of file 230 to guest 122's memory space (e.g., a guest memory address identified as available in request 220). In an example, when hypervisor 120 maps file 230 to guest 122's memory space (e.g., at GVA 291), file 230 may not yet be loaded to random access memory (e.g., memory device 114) on host 110. Instead, file 230 may be stored in a persistent storage device (e.g., HDD, SSD) and HPA 271A may identify a reserved host memory address into which file 230 will be paged when the contents of file 230 are requested.

The guest directly accesses the file in the host memory with the GMA (block 430). In an example, guest 122 directly accesses file 230 in memory device 114 via mappings to HPA 271A of file 230. In an example, file 230 is only loaded to HPA 271A after guest 122 requests to open the contents of GVA 291 (and therefore GPA 281A and HPA 271A). In an example, attempting to retrieve the contents of GVA 291 prior to file 230 being loaded to HPA 271A triggers a page fault, causing file 230 to be transferred from persistent storage to HPA 271A. In an example, guest 122 updates file 230 and requests to commit the update to persistent storage (e.g., memory device 114). In the example, guest 122 (e.g., guest OS 196A) issues a memory synchronization request (e.g., msync( ) fsync( )) that is intercepted by storage controller 140, and storage controller 140 sends a corresponding memory synchronization request in a format compatible with FS daemon 130 to FS daemon 130 via FS queue 142 or 144. In the example, FS daemon 130 and/or hypervisor 120 validates guest 122's authority to update file 130. In an example, FS daemon 130 issues a synchronization request to a supervisor of host 110 (e.g., hypervisor 120, host OS 118) associated with the updated file 230 (e.g., via a file identifier, file descriptor, file handle, etc.). In the example, the synchronization request (e.g., fsync( ) fdatasync( )) causes the supervisor to transfer the updates from a transient memory (e.g., random access memory, CPU cache, etc.) to a persistent storage volume (e.g., HDD, SSD, persistent memory). In an example, FS daemon 130 issues a memory synchronization request that includes a change freeze operation to prevent conflicting data updates and a durability operation to commit requested data updates (e.g., a "fence" operation). For example, a memory synchronization operation (e.g., msync) may issue a flush command to ensure that any contents in the CPU cache of CPU 112 are moved to persistent memory (e.g., memory device 114), and then issue a fence command to prevent any other updates to the memory page updated by guest 122 until after all necessary metadata updates are complete. In an example, FS daemon 130 also provides access to file 230 to guest 124, and upon guest 122 saving changes to file 230, the changes are immediately reflected in guest 124 based on both guests accessing a same copy of the file in the host memory device 114. In an example, storage controller 140 may be configured to request a lock on file 230 by sending a lock request via FS queue 142 prior to modifying file 230, for example, to prevent a conflicting update from guest 124 from interfering with guest 122's update. In an example, file 230 is associated with a metadata entry that acts as a version counter for file 230, which may be updated (e.g., incremented) whenever changes are committed to file 230.

The guest later terminates access to the file (block 435). In an example, the filesystem daemon is then configured to cause the GMA to be unmapped. For example, guest 122 may affirmatively terminate access to file 230 (e.g., by sending a file close request to FS daemon 130 via FS queue 142 or 144). In another example, guest 122 may stop performing any active file operations (e.g., read, write, execute) on file 230 for a sufficient duration such that guest 122's access to file 230 exceeds a timeout threshold. In an example, FS daemon 130 and/or hypervisor 120 is configured to reclaim memory capacity in device memory 292A and/or guest memory 195A. In the example, memory cleanup may be triggered by a variety of triggers, for example, a configured memory usage capacity threshold may be exceeded, an access timeout threshold (e.g., for file requests corresponding to file 230 and/or other files in memory device 114) may be exceeded, an address space usage threshold for page table 248 may be exceeded (e.g., memory addresses need to be unmapped for new mappings), or an affirmative unmapping request may be received. In an example, guest OS 196A determines that the memory usage capacity threshold, the access timeout threshold, and/or the address space usage threshold is exceeded and requests FS daemon 130 (e.g., via storage controller 140) to perform memory cleanup by unmapping memory addresses in page table 248.

In an example, rather than mapping the host memory address of a requested file (e.g., HPA 271A of file 230) to guest 122 to allow guest 122 access to file 230, file 230 may instead be transmitted via FS queue 142 or 144. In the example, FS daemon 130 requests file 230 from memory device 114 via hypervisor 120 in response to request 220 and access to file 230 to provide a copy of file 230 to guest 122. In the example, a supervisor of host 110 (e.g., host OS 118, hypervisor 120) may have access to FS queues 142 and/or 144. In the example, hypervisor 120 may directly load data to FS queue 142 or 144. in response to a file request. In an example, storage controller 140 and FS daemon 130 may request and handle files on a file basis rather than a block or page basis. In the example, translation to and from handling file contents to block or page memory addresses may be handled by hypervisor 120. In an example, retrieved file 230, or a requested portion of file 230 is loaded to a separate FS queue (e.g., not used for request transmission) for transmission to storage controller 140 and access by application 160A. In an example, FS daemon 130 and/or hypervisor 120 may be configured to assess guest 122, guest OS 196A, and/or application 160A's access permissions to file 230, and may reject the access request to file 230 based on a failed access permissions check.

Figure 5:
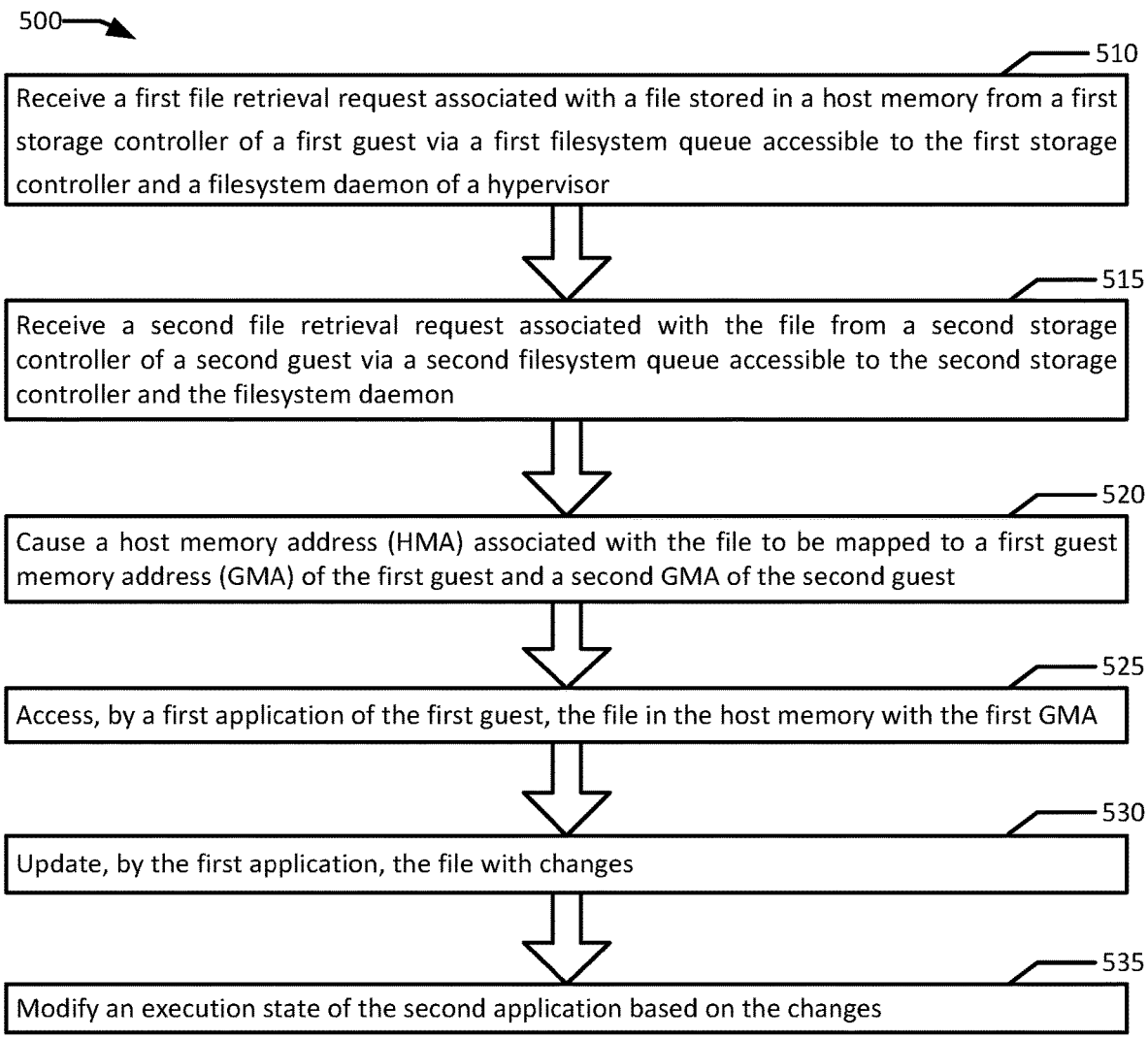
FIG. 5 is a flowchart illustrating an example of two guests sharing access to a file in host memory according to an example of the present disclosure.

FIG. 5 is a flowchart illustrating an example of two guests sharing access to a file in host memory according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 500 is performed by hypervisor 120, which includes filesystem daemon 130.

Example method 500 may begin with receiving a first file retrieval request associated with a file stored in a host memory from a first storage controller of a first guest via a first filesystem queue accessible to the first storage controller and a filesystem daemon of a hypervisor (block 510). For example, storage controller 140 in guest 122 receives a file retrieval request from application 160A, and sends the file retrieval request (e.g., request 220) to FS daemon 130 via FS queue 142. In the example, FS daemon 130 retrieves the file retrieval request from FS queue 142. In an example, storage controller 140 is a component of a guest memory device associated with guest memory 195A on guest 122, or a component of a driver associated with the guest memory device. In an example, guest memory 195A is configured to provide access to host memory device 114 for guest 122. In an example, file retrieval request 220 includes an identifier of a part of file 230 to retrieve for access rather than a whole file, for example, via an offset value from the start of the file. In such examples, instead of retrieving the whole file for access or modification, a segment of the file is identified and retrieved. For example, an offset representing the beginning of the identified segment of the file in relation to the beginning of the file is identified. This offset identifies a starting position of the requested segment, and is passed on to FS daemon 130, which includes the offset in requesting the hypervisor 120 to determine the host memory address (e.g., HPA 272A) corresponding to the start of the segment of the requested file (e.g., file 230) requested by application 160A. In such an example, rather than mapping a host memory address (e.g., HPA 271A) corresponding to the beginning of the requested file, the host memory address mapped to provide access to file 230 is adjusted with an identified memory offset (e.g., an offset from the beginning of a page or block of memory in memory device 114). This adjusted host memory address corresponding to the identified segment of file 230 may be mapped instead (e.g., HPA 272A). In an example, application 160A may request, and may be provided with, access to only part of file 230 (e.g., corresponding to HPA 272A).

A second file retrieval request associated with the file from a second storage controller of a second guest via a second filesystem queue accessible to the second storage controller and the filesystem daemon is received (block 515). For example, storage controller 150 in guest 124 receives a file retrieval request from application 160B, and sends the file retrieval request to FS daemon 130 via FS queue 152. In the example, FS daemon 130 retrieves the file retrieval request from FS queue 152. In an example, storage controller 150 is a component of a guest memory device associated with guest memory 195B on guest 124, or a component of a driver (e.g., memory device driver 156) associated with the guest memory device. In an example, guest memory 195B is configured to provide access to host memory device 114 for guest 124. In an example, file 230 is a shared configuration file that is shared by applications 160A and 160B (e.g., /etc/host.conf). In an example, guest 124 requests access to the entirety of file 230.

In an example, hypervisor 120, or a component of hypervisor 120 (e.g., FS daemon 130) determines a host memory address of file 230 (e.g., HPA 271A and/or HPA 272A). For example, FS daemon 130 sends a file operation to host OS 118 in response to receiving the file retrieval request from FS queue 142 to retrieve file 230. For example, FS daemon 130 assigns a file descriptor to file 230 (possibly with an offset identifying a section of file 230 to be retrieved). In the example, FS daemon 130 may additionally instruct hypervisor 120 to map a memory address of file 230 (e.g., HPA 271A) to a host virtual address (e.g., associated with FS daemon 130 or hypervisor 120) or to a guest memory address (e.g., GPA or GVA of guest 122). In the example, hypervisor 120 performs memory address translation to identify that HPA 271A is the memory address of the start of file 230. In another example, HPA 271A includes an offset from the beginning of a block or page on which file 230 is stored (e.g., where file 230 does not start at the beginning of a block or page).

The FS daemon causes a host memory address (HMA) associated with the file to be mapped to a first guest memory address (GMA) of the first guest and a second GMA of the second guest (block 520). In an example, HPA 271A corresponds to the start of file 230, while HPA 272A corresponds to the start of a segment of file 230 (e.g., a segment containing local area network configurations). In an example, HPA 272A corresponds to the segment of file 230 requested by application 160A, while application 160B requests the entire file 230 which starts at HPA 271A. In the example, HPA 272A is mapped to GPA 282A in hypervisor page table 135, which is then mapped to GVA 292. In the example, HPA 271A is mapped to GPA 381, which is then mapped to GVA 391.

A first application of the first guest accesses the file in the host memory with the first GMA (block 525). In an example, application 160A of guest 122 accesses file 230 in memory device 114 via GVA 292 and GPA 282A. In the example, application 160A accesses the requested part of file 230 rather than the entirety of file 230. In an example, application 160A's access to file 230 may be restricted to the identified part of file 230. For example, filesystem daemon 130, hypervisor 120, and/or host OS 118 may be configured to restrict access to parts of file 230 from guest 122. In an example, GVA 292 is mapped to an address space of application 160A, and GVA 292 is translated to GPA 282B (e.g., a copy of GPA 282A) and then from GPA 282A to HPA 272A for application 160A to access file 230. In an example, application 160A is provided direct access to file 230 with no intermittent caching of copies of file 230 by host OS 118, hypervisor 120, FS daemon 130, and/or guest OS 196A.

The first application updates the file with changes (block 530). In an example, guest 122 (e.g., application 160A) updates file 230 (e.g., with updated LAN configurations) and requests to commit the update to persistent storage (e.g., memory device 114). In the example, guest 122 (e.g., guest OS 196A) issues a memory synchronization request (e.g., msync) that is intercepted by storage controller 140, and storage controller 140 sends a corresponding memory synchronization request in a format compatible with FS daemon 130 to FS daemon 130 via FS queue 142 or 144. In the example, FS daemon 130 and/or hypervisor 120 validates guest 122's authority to update file 130. In an example, upon validating permissions, a memory synchronization operation is triggered by FS daemon 130 (e.g., msync), which issues a flush command to ensure that any contents in the CPU cache of CPU 112 are moved to persistent memory (e.g., memory device 114), and then issue a fence command to prevent any other updates to the memory page updated by guest 122 until after all necessary metadata updates are complete. In an example, storage controller 140 may be configured to request a lock on file 230 by sending a lock request via FS queue 142 prior to modifying file 230, for example, to prevent a conflicting update from guest 124 from interfering with guest 122's update. In an example, file 230 is associated with a metadata entry that acts as a version counter for file 230, which may be updated (e.g., incremented) whenever changes are committed to file 230.

An execution state of the second application is modified based on the changes (block 535). In an example, In response to the file being updated with update 320 (e.g., an updated networking setting), the execution state of application 160B is immediately impacted because application 160B is reading the entirety of file 230 via GVA 391, GPA 381, and HPA 271A. For example, the updated networking setting is applied to all subsequent processing performed by application 160B. In an example where application 160B executes with a cached local copy of file 230, an update to the cached copy may be triggered by FS daemon 130 and/or hypervisor 120 based on update 320 being committed to persistence in memory device 114. In an example, FS daemon 130 sends a request via FS queue 152 or 154 for the cached copy of file 230 on guest 124 to be updated. In another example, hypervisor 120 remaps GPA 381, GPA 382, GVA 391, and/or GVA 392 triggering guest OS 196B to recognize the updated file 330. In an example, application 160A may access only part of file 230 (e.g., HPA 271A) and not the whole file 230 (e.g., HPAs 271A and 272A). In the example, update 320 made to the part of file 230 (e.g., HPA 271A) being accessed by application 160A is still reflected in an execution state of application 160B which may be accessing the entire file 230 (e.g., HPAs 271A and 272A).

Figure 6:
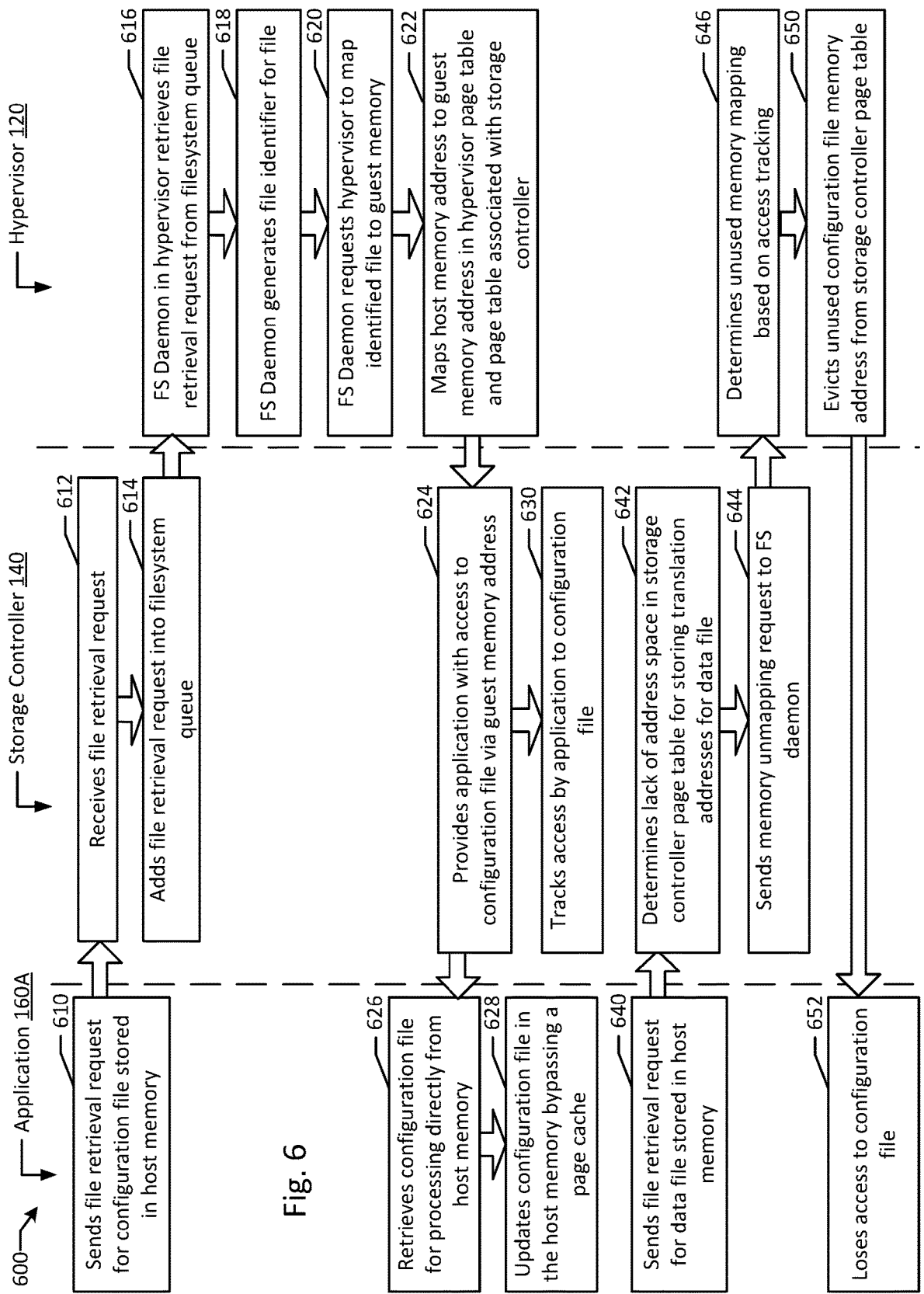
FIG. 6 is flow diagram of a guest being provided access to a file in host memory and then later losing access to the file according to an example of the present disclosure.

FIG. 6 is flow diagram of a guest being provided access to a file in host memory and then later losing access to the file according to an example of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, application 160A requests access to a file stored in memory device 114 via storage controller 140 and FS daemon 130.

In example system 600, application 160A sends a file retrieval request for a configuration file 230 stored in host memory device 114 (block 610). In the example, storage controller 140 receives the file retrieval request (block 612). In an example, storage controller 140 identifies a range of guest memory addresses that are currently available for mapping and includes the range of guest memory addresses in file retrieval request 220. Storage controller 140 then adds the file retrieval request 220 to FS queue 142 (block 614). In various examples, storage controller 140 may perform one or more types of message translation to the file retrieval request to make the file retrieval request compatible with FS queue 142 and/or FS daemon 130. In an example, FS daemon 130 retrieves file retrieval request 220 from FS queue 142 (block 616). FS daemon 130 then generates a file identifier (e.g., file descriptor and/or inode) for configuration file 230 (block 618). FS daemon 130 requests hypervisor 120 to map configuration file 230 to guest memory 195A (e.g., via the available guest memory addresses identified in file retrieval request 220) (block 620). In an example, FS daemon 130 and/or hypervisor 120 maps HPA 271A to GPA 281A in hypervisor page table 135, and GPA 281B (e.g. the same address as GPA 281A) to GVA 291 in page table 248 associated with storage controller 140 (block 622). In an example, storage controller 140 provides application 160A access to the configuration file 230 via GVA 291 (block 624). In an example, application 160A retrieves configuration file 230 for processing directly from host memory device 114 via GVA 291 mapped to GPA 281A and HPA 271A (block 626). In an example, application 160A updates configuration file 230 in host memory 114, bypassing a page cache of guest OS 196A and/or a page cache of host OS 118 (block 628). In an example, storage controller 140 tracks access metrics to configuration file 230 by application 160A (e.g., last access time, access frequency) (block 630).

In an example, application 160A sends a new file retrieval request for a data file stored in host memory device 114 (block 640). In the example, storage controller 140 determines that page table 248 lacks address space to map guest memory addresses for translation of memory addresses of the data file (block 642). In an example, storage controller 140 sends a memory unmapping request to FS daemon 130 (e.g., via FS queue 142) to free up memory address space (e.g., page table entries) in page table 248 (block 644). In an example, FS daemon 130 determines memory mappings in page table 248 that are unused (e.g., based on storage controller 140's access tracking) (block 646). In an example, the data file may be substantially larger than the configuration file and may be associated with many memory address mappings. In the example, FS daemon 130 evicts the configuration file 230's corresponding mapping to GVA 291, which is identified as unused, from page table 248 (block 650). For example, the determination that the mapping for GVA 291 is unused may be based on storage controller 140's usage tracking. In an example, application 160A loses access to configuration file 230 based on the eviction (block 652). In an example, after sufficient address space is cleared up in page table 248 to map the data file's addresses, FS daemon 130 maps the data file's addresses to page table 248, thereby providing application 160A with access to the data file.

Figure 7:
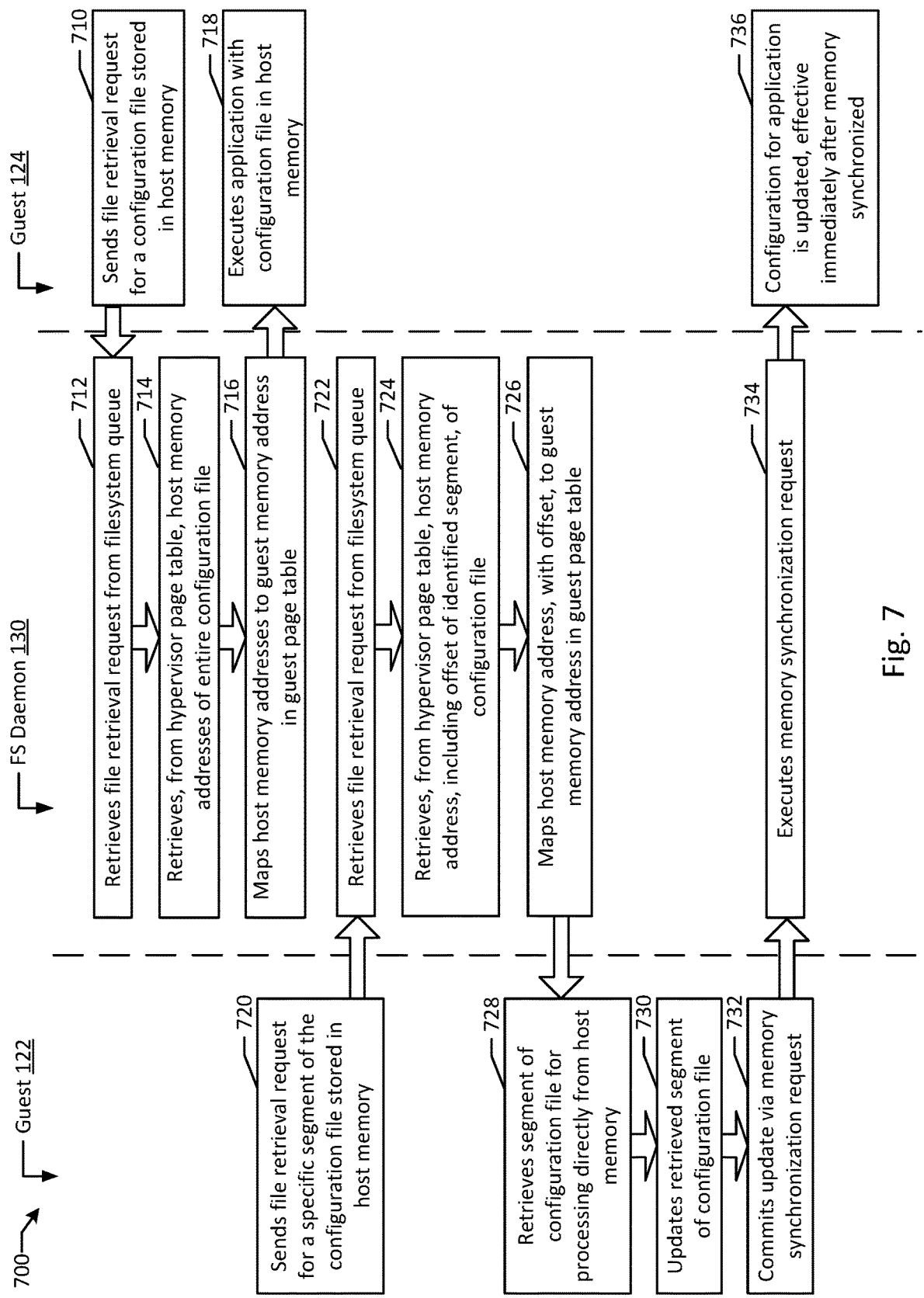
FIG. 7 is flow diagram of two guests sharing access and updates to a file in host memory according to an example of the present disclosure.

FIG. 7 is flow diagram of two guests sharing access and updates to a file in host memory according to an example of the present disclosure. Although the examples below are described with reference to the flow diagram illustrated in FIG. 7, it will be appreciated that many other methods of performing the acts associated with FIG. 7 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 700, application guests 122 and 124 both access a file in memory device 114 via filesystem daemon 130, and guest 122 updates the file.

In example system 700, guest 124 (e.g., application 160B) sends a file retrieval request for configuration file 230 in host memory device 114 to FS daemon 130 (e.g., via storage controller 150 and FS queue 152) (block 710). In the example, FS daemon 130 retrieves the file retrieval request from FS queue 152 (block 712). FS daemon 130 then retrieves, from hypervisor page table 135, HPAs 271A and 272A associated with the entire configuration file 230 (block 714). In the example, HPAs 271A and 272A are mapped (indirectly via GPA 381 and 382) to GVAs 391 and 392 in page table 348 (block 716). In the example, guest 124 executes application 160B with configuration file 230 in host memory device 114 (block 718).

In an example, guest 122 (e.g., application 160A) sends a file retrieval request for a specific segment of configuration file 230 in host memory device 114 to FS daemon 130 (e.g., via storage controller 140 and FS queue 142) (block 720). In the example, FS daemon 130 retrieves the file retrieval request 220 from FS queue 142 (block 722). FS daemon 130 then retrieves, from hypervisor page table 135, HPA 272A which includes an offset from the start of file 230 corresponding to the identified segment of configuration file 230 requested by application 160A (block 724). In the example, HPA 272A includes the offset from the beginning of file 230, and HPA 272A is mapped (indirectly via GPA 282A) to GVAs 292 in page table 248 (block 726). In the example, guest 122 (e.g., application 160A) retrieves the identified segment of configuration file 230 directly from host memory device 114 via GVA 292 to process (block 728). In an example, guest 122 updates the retrieved segment of the configuration file 230 (block 730). In an example, guest 122 commits the update via a memory synchronization request sent to FS daemon 130 via storage controller 140 and FS queue 142 (block 732). In the example, FS daemon 130 triggers execution of a memory synchronization request corresponding to a page of memory including HPA 272A updated by guest 122 (block 734). In an example, guest 124 and application 160B's configuration is updated with the updates committed by guest 122 substantially immediately after the memory synchronization request completes based on accessing file 230 (block 736).

Figure 8:
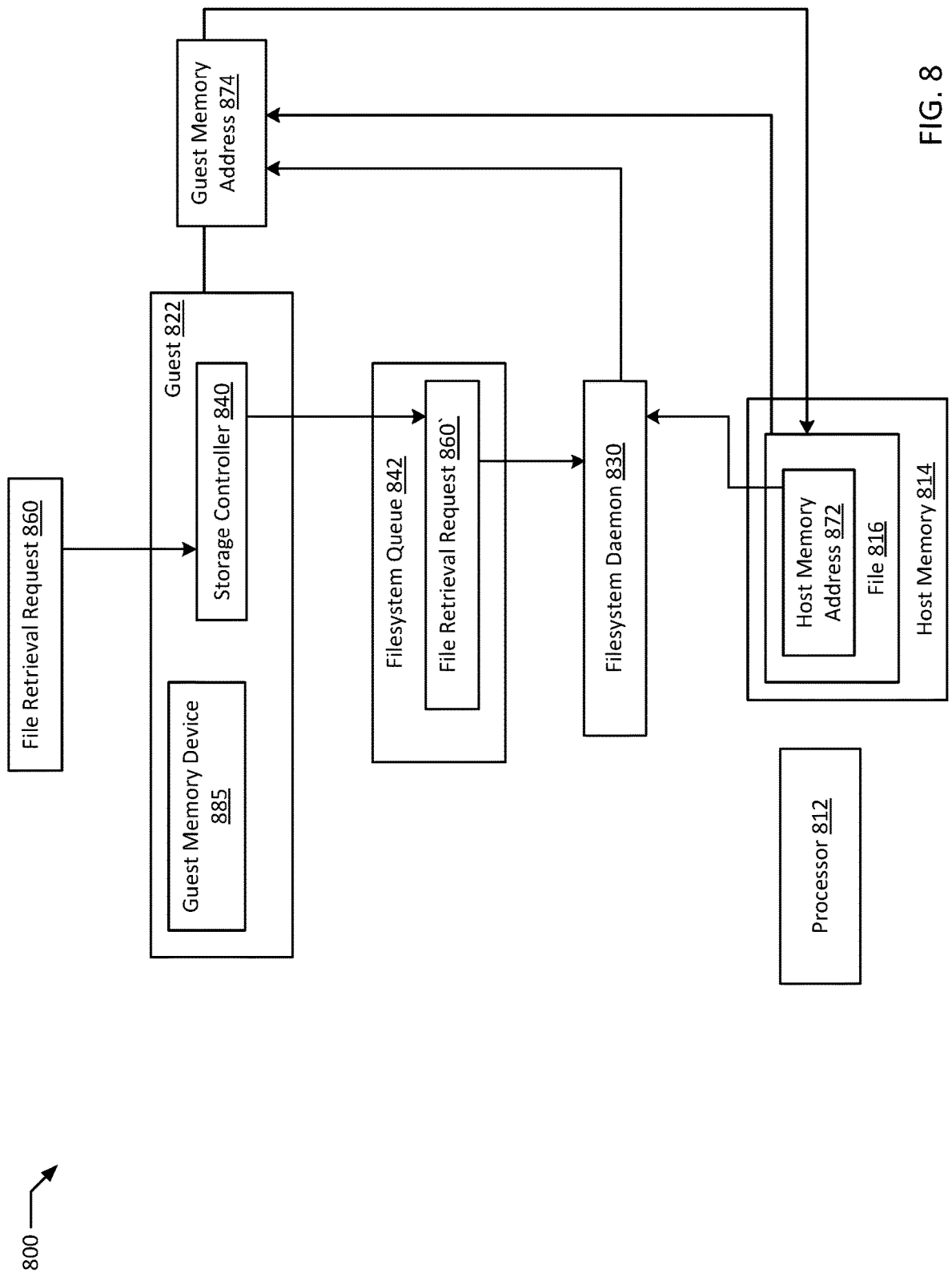
FIG. 8 is a block diagram of an example system where a guest retrieves a file stored in host memory according to an example of the present disclosure.

FIG. 8 is a block diagram of an example system where a guest retrieves a file stored in host memory according to an example of the present disclosure. Example system 800 includes a processor 812, a host memory 814, a filesystem daemon 830, a guest 822 including a guest memory device 895 and a storage controller 840, and a filesystem queue 842 accessible to both filesystem daemon 830 and storage controller 840. Storage controller 840 is configured to receive file retrieval request 860 associated with a file 816 stored in the host memory 814, and forward file retrieval request 860 to the filesystem daemon 830 by adding file retrieval request 860 to filesystem queue 842 as file retrieval request 860'. Filesystem daemon 830 is configured to retrieve filesystem request 860' from filesystem queue 842, determine host memory address 872 associated with file 816, and cause host memory address 872 to be mapped to guest memory address 874. Guest 822 is configured to directly access file 816 in host memory 814 with guest memory address 874 and later terminate access to file 816, where filesystem daemon 830 is then configured to cause guest memory address 874 to be unmapped.

Figure 9:
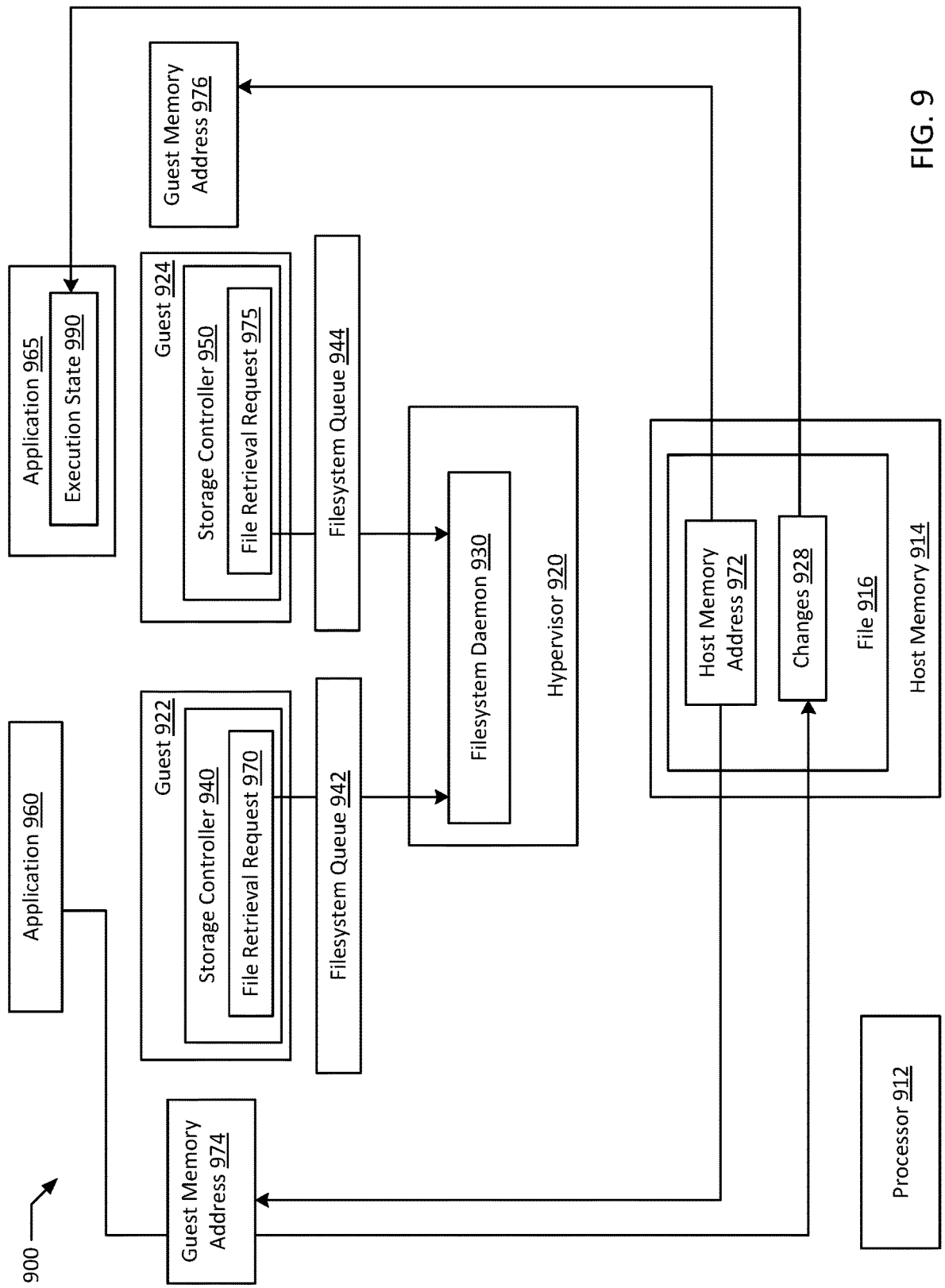
FIG. 9 is a block diagram of an example system where a guest updates a file stored in host memory that is shared with another guest according to an example of the present disclosure.

FIG. 9 is a block diagram of an example system where a guest updates a file stored in host memory that is shared with another guest according to an example of the present disclosure. Example system 900 includes a processor 912, a host memory 914, a hypervisor 920 including a filesystem daemon 930, a guest 922 including storage controller 940 and application 960, a guest 924 including storage controller 950 and application 965, a filesystem queue 942 accessible to filesystem daemon 930 and storage controller 940, and a filesystem queue 944 accessible to filesystem daemon 930 and storage controller 950. The filesystem daemon 930 is configured to receive file retrieval request 970 associated with file 916 stored in host memory 914 from storage controller 940 via filesystem queue 942 and file retrieval request 975 associated with file 916 from storage controller 950 via filesystem queue 944. Host memory address 972 associated with file 916 is determined. Host memory address 972 is mapped to guest memory address 974 of guest 922 and guest memory address 976 of guest 924. Application 960 is configured to access file 916 in host memory 914 with guest memory address 974 and update file 916 with changes 928. In response to file 916 being updated by application 960, application 965 is configured to modify execution state 990 of application 965 based on changes 928.

Direct access to host memory for guests as described in the present disclosure enables data exchange between guests and their host as well as between guests on the same host in a manner that is both faster and more extensible than is available using networking protocols while offering comparable data security. By implementing queues accessible to both guests and their hosts, while restricting messages in those queues to messages of certain restricted types, file operations may be passed from guest to host without requiring the guest to have any heightened access or control over the host. Data security is therefore similar to data retrieval over networking protocols. Where multiple guests share the same file in host memory, the file sharing may be additionally used as a very fast communication channel between the two guests, since changes to the file are reflected to all of the guests accessing the file simultaneously. A quick notification between guests that the file has been updated, or an alert from the kernel that the file has been updated would make all of the guests aware of the change, thereby triggering any necessary additional computational steps with the updated file. Since file operations and commands are transferred over filesystem queues, the filesystem daemon and hypervisor may enforce policies against unauthorized access. However, by allowing data retrieval operations to be executed directly between a guest and a host memory after the operation is requested over a filesystem queue, additional buffering and transmission latency may be reduced. In addition, committing modifications to any file thus accessed may be additionally validated and gated by the filesystem daemon and hypervisor providing additional security against unauthorized changes. As a result, processing tasks in shared environments are more efficient due to less latency from file sharing operations between guests and hosts, and therefore higher compute utilization may be advantageously achieved.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: (i) a processor, (ii) a host memory, (iii) a filesystem daemon, (iv) a guest including a guest memory device and a storage controller, and (v) a filesystem queue accessible to both the filesystem daemon and the storage controller, wherein the storage controller is configured to: receive a file retrieval request associated with a file stored in the host memory; and forward the file retrieval request to the filesystem daemon by adding the file retrieval request to the filesystem queue, wherein the filesystem daemon is configured to: retrieve the file retrieval request from the filesystem queue; and cause a host memory address (HMA) associated with the file to be mapped to a guest memory address (GMA), wherein the guest is configured to: directly access the file in the host memory with the GMA; and later terminate access to the file, wherein the filesystem daemon is then configured cause the GMA to be unmapped.

In accordance with a 2nd exemplary aspect of the present disclosure, which may be used in combination with any one or more of other aspects described herein (e.g., the 1st aspect), wherein the file retrieval request includes an identifier of an identified part of the file to be accessed, and the filesystem daemon is configured to: determine a memory offset associated with a starting position of the identified part in the host memory; and adjust the first HMA with the memory offset allowing the guest to directly access the identified part via the first GMA. In accordance with a 3rd exemplary aspect of the present disclosure, which may be used in combination with any one or more of other aspects described herein (e.g., the 2nd aspect), wherein the guest's access to the file is limited to a segment of the file that includes the identified part.

In accordance with a 4th exemplary aspect of the present disclosure, which may be used in combination with any one or more of other aspects described herein (e.g., the 1st aspect), wherein the filesystem queue is a low priority queue that handles file requests, and high priority queues handle at least one of instructional requests and metadata requests between the storage controller and the filesystem daemon. In accordance with a 5th exemplary aspect of the present disclosure, which may be used in combination with any one or more of other aspects described herein (e.g., the 4 th aspect), wherein the guest updates the file, and the storage controller sends a memory synchronization request to the filesystem daemon via a high priority queue, and the filesystem daemon is configured to: flush processor caches of the processor; and execute a fence operation to commit the updated file to persistent storage. In accordance with a 6th exemplary aspect of the present disclosure, which may be used in combination with any one or more of other aspects described herein (e.g., the 4th aspect), wherein a metadata request to retrieve metadata related to the file is received by the filesystem daemon via a high priority queue while the filesystem daemon is handling the file retrieval request, and the metadata is provided to the guest before access to the file is provided to the guest.

In accordance with a 7th exemplary aspect of the present disclosure, which may be used in combination with any one or more of other aspects described herein (e.g., the 1st aspect), wherein the storage controller is a component of one of (i) the guest memory device that appears to applications executing on the guest as a physical storage device, and (ii) a driver of the guest memory device, and wherein the guest memory device is configured to provide access to files stored in the host memory. In accordance with an 8th exemplary aspect of the present disclosure, which may be used in combination with any one or more of other aspects described herein (e.g., the 1st aspect), wherein the guest maps the GMA to a memory space of an application allowing the application direct access to the file. In accordance with a 9th exemplary aspect of the present disclosure, which may be used in combination with any one or more of other aspects described herein (e.g., the 1st aspect), wherein one of the filesystem daemon and a hypervisor hosting the filesystem daemon rejects a different file retrieval request to access a different file based on access permissions associated with the different file.

In accordance with a 10th exemplary aspect of the present disclosure, which may be used in combination with any one or more of other aspects described herein (e.g., the 1st aspect), wherein the filesystem daemon provides access to the file to a different guest, and upon the guest saving changes to the file, the changes are immediately reflected in the different guest based on both guests accessing a same copy of the file in the host memory. In accordance with a 11th exemplary aspect of the present disclosure, which may be used in combination with any one or more of other aspects described herein (e.g., the 10th aspect), wherein the storage controller requests a lock on the file by sending a lock request via the filesystem queue to the filesystem daemon prior to the guest modifying the file. In accordance with a 12th exemplary aspect of the present disclosure, which may be used in combination with any one or more of other aspects described herein (e.g., the 10th aspect), wherein a version counter of the file is updated whenever changes are saved to the file.

In accordance with a 13th exemplary aspect of the present disclosure, which may be used in combination with any one or more of other aspects described herein (e.g., the 1st aspect), wherein one of the filesystem daemon and a hypervisor unmaps the GMA based on one of a memory capacity threshold, an access timeout, an address space threshold, and an unmapping request.

Aspects of the subject matter described herein may be useful alone or in combination with one or more other aspects described herein. In a 14th exemplary aspect of the present disclosure, a system comprises a means for receiving, by a storage controller on a guest, a file retrieval request associated with a file stored in a host memory; a means for forwarding, by the storage controller, the file retrieval request to a filesystem daemon by adding the file retrieval request to a filesystem queue accessible to both the filesystem daemon and the storage controller; a means for retrieving, by the filesystem daemon, the file retrieval request from the filesystem queue; a means for mapping a host memory address (HMA) associated with the file to a guest memory address (GMA); a means for directly accessing, by the guest, the file in the host memory with the GMA; and a means for later terminating, by the guest, access to the file, wherein the filesystem daemon is then configured to cause the GMA to be unmapped.

Aspects of the subject matter described herein may be useful alone or in combination with one or more other aspects described herein. In a 15th exemplary aspect of the present disclosure, a computer-readable non-transitory storage medium storing executable instructions, which when executed by a computer system, cause the computer system to: receive, by a storage controller on a guest, a file retrieval request associated with a file stored in a host memory; forward, by the storage controller, the file retrieval request to a filesystem daemon by adding the file retrieval request to a filesystem queue accessible to both the filesystem daemon and the storage controller; retrieve, by the filesystem daemon, the file retrieval request from the filesystem queue; map a host memory address (HMA) associated with the file to a guest memory address (GMA); directly access, by the guest, the file in the host memory with the GMA; and later terminate, by the guest, access to the file, wherein the filesystem daemon is then configured to cause the GMA to be unmapped.

Aspects of the subject matter described herein may be useful alone or in combination with one or more other aspects described herein. In a 16th exemplary aspect of the present disclosure, a method comprises receiving, by a storage controller on a guest, a file retrieval request associated with a file stored in a host memory; forwarding, by the storage controller, the file retrieval request to a filesystem daemon by adding the file retrieval request to a filesystem queue accessible to both the filesystem daemon and the storage controller; retrieving, by the filesystem daemon, the file retrieval request from the filesystem queue; mapping a host memory address (HMA) associated with the file to a guest memory address (GMA); directly accessing, by the guest, the file in the host memory with the GMA; and later terminating, by the guest, access to the file, wherein the filesystem daemon is then configured to cause the GMA to be unmapped.

In accordance with a 17th exemplary aspect of the present disclosure, which may be used in combination with any one or more of other aspects described herein (e.g., the 14th, 15th, or 16th aspects), wherein the file retrieval request includes an identifier of an identified part of the file to be accessed, the method further comprising: determining a memory offset associated with a starting position of the identified part in the host memory; and adjusting the first HMA with the memory offset allowing the guest to directly access the identified part via the first GMA. In accordance with an 18th exemplary aspect of the present disclosure, which may be used in combination with any one or more of other aspects described herein (e.g., the 17th aspect), further comprising: limiting the guest's access to the file to a segment of the file that includes the identified part.

In accordance with a 19th exemplary aspect of the present disclosure, which may be used in combination with any one or more of other aspects described herein (e.g., the 14th, 15th, or 16th aspects), wherein the filesystem queue is a low priority queue that handles file requests, and high priority queues handle at least one of instructional requests and metadata requests between the storage controller and the filesystem daemon. In accordance with a 20th exemplary aspect of the present disclosure, which may be used in combination with any one or more of other aspects described herein (e.g., the 19th aspect), further comprising: updating, by the guest, the file; sending, by the storage controller, a memory synchronization request to the filesystem daemon via a high priority queue; flushing processor caches of a processor; and executing a fence operation to commit the updated file to persistent storage. In accordance with a 21st exemplary aspect of the present disclosure, which may be used in combination with any one or more of other aspects described herein (e.g., the 19th aspect), further comprising: receiving, by the filesystem daemon, a metadata request to retrieve metadata related to the file via a high priority queue while the filesystem daemon is handling the file retrieval request; and providing the metadata to the guest before access to the file is provided to the guest.

In accordance with a 22nd exemplary aspect of the present disclosure, which may be used in combination with any one or more of other aspects described herein (e.g., the 14th, 15th, or 16th aspects), wherein the storage controller is a component of one of (i) a guest memory device that appears to applications executing on the guest as a physical storage device, and (ii) a driver of the guest memory device, and wherein the guest memory device is configured to provide access to files stored in the host memory. In accordance with a 23rd exemplary aspect of the present disclosure, which may be used in combination with any one or more of other aspects described herein (e.g., the 14th, 15th, or 16th aspects), further comprising: mapping the GMA to a memory space of an application allowing the application direct access to the file. In accordance with a 24th exemplary aspect of the present disclosure, which may be used in combination with any one or more of other aspects described herein (e.g., the 14th, 15th, or 16th aspects), further comprising: rejecting, by one of the filesystem daemon and a hypervisor hosting the filesystem daemon, a different file retrieval request to access a different file based on access permissions associated with the different file.

In accordance with a 25th exemplary aspect of the present disclosure, which may be used in combination with any one or more of other aspects described herein (e.g., the 14th, 15th, or 16th aspects), further comprising: providing, by the filesystem daemon, access to the file to a different guest, wherein upon the guest saving changes to the file, the changes are immediately reflected in the different guest based on both guests accessing a same copy of the file in the host memory. In accordance with a 26th exemplary aspect of the present disclosure, which may be used in combination with any one or more of other aspects described herein (e.g., the 25th aspect), further comprising: requesting, by the storage controller, a lock on the file by sending a lock request via the filesystem queue to the filesystem daemon prior to the guest modifying the file. In accordance with a 27th exemplary aspect of the present disclosure, which may be used in combination with any one or more of other aspects described herein (e.g., the 25th aspect), further comprising: updating a version counter of the file whenever changes are saved to the file.

In accordance with a 28th exemplary aspect of the present disclosure, which may be used in combination with any one or more of other aspects described herein (e.g., the 14th, 15th, or 16th aspects), further comprising: unmapping, by one of the filesystem daemon and a hypervisor, the GMA based on one of a memory capacity threshold, an access timeout, an address space threshold, and an unmapping request.

Aspects of the subject matter described herein may be useful alone or in combination with one or more other aspects described herein. In a 29th exemplary aspect of the present disclosure, a system comprises (i) a processor, (ii) a host memory, (iii) a hypervisor including a filesystem daemon, (iv) a first guest including a first storage controller and a first application, (v) a second guest including a second storage controller and a second application, (vi) a first filesystem queue accessible to the filesystem daemon and the first storage controller, and (vii) and a second filesystem queue accessible to the filesystem daemon and the second storage controller, wherein the filesystem daemon is configured to: receive a first file retrieval request associated with a file stored in the host memory from the first storage controller via the first filesystem queue and a second file retrieval request associated with the file from the second storage controller via the second filesystem queue; map a host memory address (HMA) associated with the file to a first guest memory address (GMA) of the first guest and a second GMA of the second guest; wherein the first application is configured to: access the file in the host memory with the first GMA; and update the file with changes, and wherein responsive to the file being updated by the first application the second application is configured to modify an execution state of the second application based on the changes.

In accordance with a 30th exemplary aspect of the present disclosure, which may be used in combination with any one or more of other aspects described herein (e.g., the 29th aspect), wherein the first file retrieval request includes an identifier of an identified part of the file to be accessed, and the filesystem daemon is configured to: determine a memory offset associated with a starting position of the identified part in the host memory; and adjust the first HMA with the memory offset allowing the application to directly access the identified part via the first GMA, wherein the first application's access to the file is limited to a segment of the file that includes the identified part. In accordance with a 31st exemplary aspect of the present disclosure, which may be used in combination with any one or more of other aspects described herein (e.g., the 29th aspect), wherein when the first application updates the file, the first storage controller sends a memory synchronization request to the filesystem daemon via a high priority queue, and the filesystem daemon is configured to: execute a flush operation on processor caches of the processor; and execute a fence operation to commit the updated file to persistent storage, wherein the second application is restricted from updating the file while the flush operation and the fence operation are executing. In accordance with a 32nd exemplary aspect of the present disclosure, which may be used in combination with any one or more of other aspects described herein (e.g., the 29th aspect), wherein the first storage controller is a component of one of (i) a guest memory device that appears to applications executing on the first guest as a peripheral component interconnect device, and (ii) a driver of the guest memory device, and wherein the guest memory device is configured to provide access to files stored in the host memory. In accordance with a 33rd exemplary aspect of the present disclosure, which may be used in combination with any one or more of other aspects described herein (e.g., the 29th aspect), wherein one of the filesystem daemon and the hypervisor rejects a different file retrieval request to access a different file based on access permissions associated with the different file. In accordance with a 34th exemplary aspect of the present disclosure, which may be used in combination with any one or more of other aspects described herein (e.g., the 29th aspect), wherein the first storage controller requests a lock on the file by sending a lock request via the first filesystem queue to the filesystem daemon prior to the first application modifying the file. In accordance with a 35th exemplary aspect of the present disclosure, which may be used in combination with any one or more of other aspects described herein (e.g., the 29th aspect), wherein a version counter of the file is updated whenever changes are saved to the file. In accordance with a 36th exemplary aspect of the present disclosure, which may be used in combination with any one or more of other aspects described herein (e.g., the 29th aspect), wherein one of the filesystem daemon and the hypervisor unmaps the first GMA based on one of a memory capacity threshold, an access timeout, an address space threshold, and an unmapping request. In accordance with a 37th exemplary aspect of the present disclosure, which may be used in combination with any one or more of other aspects described herein (e.g., the 29th aspect), wherein the first application accesses the file via a third GMA associated with the first application, which is translated to the first GMA with a guest page table. In accordance with a 38th exemplary aspect of the present disclosure, which may be used in combination with any one or more of other aspects described herein (e.g., 29th aspect), wherein the first application updates the file, and the filesystem daemon is configured to: issue a synchronization request to the hypervisor associated with the file which causes the updated file to be saved to persistent storage.

Aspects of the subject matter described herein may be useful alone or in combination with one or more other aspects described herein. In a 39th exemplary aspect of the present disclosure, a system comprises a means for a means for receiving a first file retrieval request associated with a file stored in a host memory from a first storage controller of a first guest via a first filesystem queue accessible to the first storage controller and a filesystem daemon of a hypervisor; a means for receiving a second file retrieval request associated with the file from a second storage controller of a second guest via a second filesystem queue accessible to the second storage controller and the filesystem daemon; a means for mapping a host memory address (HMA) associated with the file to a first guest memory address (GMA) of the first guest and a second GMA of the second guest; a means for accessing, by a first application of the first guest, the file in the host memory with the first GMA; a means for updating, by the first application, the file with changes; and responsive to the file being updated, a means for modifying an execution state of the second application based on the changes.

Aspects of the subject matter described herein may be useful alone or in combination with one or more other aspects described herein. In a 40th exemplary aspect of the present disclosure, a computer-readable non-transitory storage medium storing executable instructions, which when executed by a computer system, cause the computer system to: receive a first file retrieval request associated with a file stored in a host memory from a first storage controller of a first guest via a first filesystem queue accessible to the first storage controller and a filesystem daemon of a hypervisor; receive a second file retrieval request associated with the file from a second storage controller of a second guest via a second filesystem queue accessible to the second storage controller and the filesystem daemon; map a host memory address (HMA) associated with the file to a first guest memory address (GMA) of the first guest and a second GMA of the second guest; access, by a first application of the first guest, the file in the host memory with the first GMA; update, by the first application, the file with changes; and responsive to the file being updated, modify an execution state of the second application based on the changes.

Aspects of the subject matter described herein may be useful alone or in combination with one or more other aspects described herein. In a 41st exemplary aspect of the present disclosure, a method comprises receiving a first file retrieval request associated with a file stored in a host memory from a first storage controller of a first guest via a first filesystem queue accessible to the first storage controller and a filesystem daemon of a hypervisor; receiving a second file retrieval request associated with the file from a second storage controller of a second guest via a second filesystem queue accessible to the second storage controller and the filesystem daemon; mapping a host memory address (HMA) associated with the file to a first guest memory address (GMA) of the first guest and a second GMA of the second guest; accessing, by a first application of the first guest, the file in the host memory with the first GMA; updating, by the first application, the file with changes; and responsive to the file being updated, modifying an execution state of the second application based on the changes.

In accordance with a 42nd exemplary aspect of the present disclosure, which may be used in combination with any one or more of other aspects described herein (e.g., the 39th, 40th, or 41st aspects), wherein the first file retrieval request includes an identifier of an identified part of the file to be accessed, the method further comprising: determining a memory offset associated with a starting position of the identified part in the host memory; and adjusting the first HMA with the memory offset allowing the application to directly access the identified part via the first GMA, wherein the first application's access to the file is limited to a segment of the file that includes the identified part. In accordance with a 43rd exemplary aspect of the present disclosure, which may be used in combination with any one or more of other aspects described herein (e.g., the 39th, 40th, or 41st aspects), further comprising: sending, by the first storage controller a memory synchronization request to the filesystem daemon via a high priority queue when the first application updates the file; executing a flush operation on processor caches of a processor; and executing a fence operation to commit the updated file to persistent storage, wherein the second application is restricted from updating the file while the flush operation and the fence operation are executing. In accordance with a 44th exemplary aspect of the present disclosure, which may be used in combination with any one or more of other aspects described herein (e.g., the 39th, 40th, or 41st aspects), wherein the first storage controller is a component of one of (i) a guest memory device that appears to applications executing on the first guest as a peripheral component interconnect device, and (ii) a driver of the guest memory device, and wherein the guest memory device is configured to provide access to files stored in the host memory. In accordance with a 45th exemplary aspect of the present disclosure, which may be used in combination with any one or more of other aspects described herein (e.g., the 39th, 40th, or 41st aspects), further comprising: rejecting, by one of the filesystem daemon and the hypervisor, a different file retrieval request to access a different file based on access permissions associated with the different file. In accordance with a 46th exemplary aspect of the present disclosure, which may be used in combination with any one or more of other aspects described herein (e.g., the 39th, 40th, or 41st aspects), further comprising: requesting, by the first storage controller, a lock on the file by sending a lock request via the first filesystem queue to the filesystem daemon prior to the first application modifying the file. In accordance with a 47th exemplary aspect of the present disclosure, which may be used in combination with any one or more of other aspects described herein (e.g., the 39th, 40th, or 41st aspects), further comprising: updating a version counter of the file whenever changes are saved to the file. In accordance with a 48th exemplary aspect of the present disclosure, which may be used in combination with any one or more of other aspects described herein (e.g., the 39th, 40th, or 41st aspects), further comprising: unmapping, by one of the filesystem daemon and the hypervisor, the first GMA based on one of a memory capacity threshold, an access timeout, an address space threshold, and an unmapping request. In accordance with a 49th exemplary aspect of the present disclosure, which may be used in combination with any one or more of other aspects described herein (e.g., the 39th, 40th, or 41st aspects), wherein the first application accesses the file via a third GMA associated with the first application, which is translated to the first GMA with a guest page table. In accordance with a 50th exemplary aspect of the present disclosure, which may be used in combination with any one or more of other aspects described herein (e.g., the 39th, 40th, or 41st aspects), further comprising: updating, by the first application, the file; and issuing, by the filesystem daemon, a synchronization request to the hypervisor associated with the file which causes the updated file to be saved to persistent storage.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a processor, a host memory, a hypervisor including a filesystem daemon, a first guest including a first storage controller and a first application, a second guest including a second storage controller and a second application, a first filesystem queue accessible to the filesystem daemon and the first storage controller, and a second filesystem queue accessible to the filesystem daemon and the second storage controller, wherein the filesystem daemon is configured to:
      receive a first file retrieval request associated with a file stored in the host memory from the first storage controller via the first filesystem queue and a second file retrieval request associated with the file from the second storage controller via the second filesystem queue;
      cause a host memory address (HMA) associated with the file to be mapped to a first guest memory address (GMA) of the first guest and a second GMA of the second guest;
   wherein the first application is configured to:
      access the file in the host memory with the first GMA; and
      update the file with changes,
   wherein responsive to the file being updated by the first application, the second application is configured to modify an execution state of the second application based on the changes, and
   wherein the first file retrieval request includes an identifier of an identified part of the file to be accessed, and the filesystem daemon is configured to:
      determine a memory offset associated with a starting position of the identified part in the host memory; and
      adjust the first HMA with the memory offset allowing the application to directly access the identified part via the first GMA, wherein the first application's access to the file is limited to a segment of the file that includes the identified part.

2. The system of claim 1, wherein when the first application updates the file, the first storage controller sends a memory synchronization request to the filesystem daemon via a high priority queue, and the filesystem daemon is configured to:
   execute a flush operation on processor caches of the processor; and
   execute a fence operation to commit the updated file to persistent storage, wherein the second application is restricted from updating the file while the flush operation and the fence operation are executing.

3. The system of claim 1, wherein the first storage controller is a component of one of (i) a guest memory device that appears to applications executing on the first guest as a peripheral component interconnect device, and (ii) a driver of the guest memory device, and wherein the guest memory device is configured to provide access to files stored in the host memory.

4. The system of claim 1, wherein one of the filesystem daemon and the hypervisor rejects a different file retrieval request to access a different file based on access permissions associated with the different file.

5. The system of claim 1, wherein the first storage controller requests a lock on the file by sending a lock request via the first filesystem queue to the filesystem daemon prior to the first application modifying the file and a version counter of the file is updated whenever changes are saved to the file.

6. The system of claim 1, wherein one of the filesystem daemon and the hypervisor unmaps the first GMA based on one of a memory capacity threshold, an access timeout, an address space threshold, and an unmapping request.

7. The system of claim 1, wherein the first application accesses the file via a third GMA associated with the first application, which is translated to the first GMA with a guest page table.

8. The system of claim 1, wherein the first application updates the file, and the filesystem daemon is configured to:
   issue a synchronization request to the hypervisor associated with the file which causes the updated file to be saved to persistent storage.

9. A method comprising:
   receiving, by a filesystem daemon of a hypervisor executing on a processor, a first file retrieval request associated with a file stored in a host memory from a first storage controller of a first guest via a first filesystem queue and a second file retrieval request associated with the file from a second storage controller of a second guest via a second filesystem queue, wherein the first file retrieval request includes an identifier of an identified part of the file to be accessed;
   causing, by the filesystem daemon, a host memory address (HMA) associated with the file to be mapped to a first guest memory address (GMA) of the first guest and a second GMA of the second guest;
   accessing, by a first application of the first guest, the file in the host memory with the first GMA;
   updating, by the first application, the file with changes;
   responsive to the file being updated by the first application, modifying, by a second application of the second guest, an execution state of the second application based on the changes;
   determining, by the filesystem daemon, a memory offset associated with a starting position of the identified part in the host memory; and
   adjusting, by the filesystem daemon, the first HMA with the memory offset allowing the application to directly access the identified part via the first GMA, wherein the first application's access to the file is limited to a segment of the file that includes the identified part.

10. The method of claim 9, further comprising:
when the first application updates the file, sending, by the first storage controller, a memory synchronization request to the filesystem daemon via a high priority queue;
executing, by the filesystem daemon, a flush operation on processor caches of the processor; and
executing, by the filesystem daemon, a fence operation to commit the updated file to persistent storage, wherein the second application is restricted from updating the file while the flush operation and the fence operation are executing.

11. The method of claim 9, wherein the first storage controller is a component of one of (i) a guest memory device that appears to applications executing on the first guest as a peripheral component interconnect device, and (ii) a driver of the guest memory device, and wherein the guest memory device is configured to provide access to files stored in the host memory.

12. The method of claim 9, further comprising rejecting, by one of the filesystem daemon and the hypervisor, a different file retrieval request to access a different file based on access permissions associated with the different file.

13. The method of claim 9, further comprising requesting, by the first storage controller, a lock on the file by sending a lock request via the first filesystem queue to the filesystem daemon prior to the first application modifying the file, wherein a version counter of the file is updated whenever changes are saved to the file.

14. The method of claim 9, further comprising unmapping, by one of the filesystem daemon and the hypervisor, the first GMA based on one of a memory capacity threshold, an access timeout, an address space threshold, and an unmapping request.

15. The method of claim 9, further comprising accessing, by the first application, the file via a third GMA associated with the first application, which is translated to the first GMA with a guest page table.

16. The method of claim 9, further comprising:
updating, by the first application, the file, and
issuing, by the filesystem daemon, a synchronization request to the hypervisor associated with the file which causes the updated file to be saved to persistent storage.

17. A non-transitory computer readable medium storing instructions which, when executed, cause a processor to execute to:

receive, by a filesystem daemon of a hypervisor, a first file retrieval request associated with a file stored in a host memory from a first storage controller of a first guest via a first filesystem queue and a second file retrieval request associated with the file from a second storage controller of a second guest via a second filesystem queue, wherein the first file retrieval request includes an identifier of an identified part of the file to be accessed;
cause, by the filesystem daemon, a host memory address (HMA) associated with the file to be mapped to a first guest memory address (GMA) of the first guest and a second GMA of the second guest;
access, by a first application of the first guest, the file in the host memory with the first GMA;
update, by the first application, the file with changes;
responsive to the file being updated by the first application, modify, by a second application of the second guest, an execution state of the second application based on the changes;
determine, by the filesystem daemon, a memory offset associated with a starting position of the identified part in the host memory; and
adjust, by the filesystem daemon, the first HMA with the memory offset allowing the application to directly access the identified part via the first GMA, wherein the first application's access to the file is limited to a segment of the file that includes the identified part.

18. The non-transitory computer readable medium of claim 17, the instructions further causing the processor to execute to reject, by one of the filesystem daemon and the hypervisor, a different file retrieval request to access a different file based on access permissions associated with the different file.

19. The non-transitory computer readable medium of claim 17, the instructions further causing the processor to execute to request, by the first storage controller, a lock on the file by sending a lock request via the first filesystem queue to the filesystem daemon prior to the first application modifying the file, wherein a version counter of the file is updated whenever changes are saved to the file.

20. The non-transitory computer readable medium of claim 17, the instructions further causing the processor to execute to unmap, by one of the filesystem daemon and the hypervisor, the first GMA based on one of a memory capacity threshold, an access timeout, an address space threshold, and an unmapping request.

* * * * *

UNITED STATES PATENT AND TRADEMARK OFFICE
CERTIFICATE OF CORRECTION

PATENT NO. : 11,308,230 B2
APPLICATION NO. : 16/259595
DATED : April 19, 2022
INVENTOR(S) : Stefan Hajnoczi et al.

It is certified that error appears in the above-identified patent and that said Letters Patent is hereby corrected as shown below:

In the Specification

In Column 9, Line 3, replace "msync( )" with -- msync( ), --.

In Column 12, Line 17, replace "msync( )" with -- msync( ), --.

In Column 16, Line 56, replace "msync( )" with -- msync( ), --.

In Column 16, Line 66, replace "fsync( )" with -- fsync( ), --.

Signed and Sealed this
Second Day of August, 2022

Katherine Kelly Vidal
*Director of the United States Patent and Trademark Office*